(12) United States Patent
Routh et al.

(10) Patent No.: US 8,437,998 B2
(45) Date of Patent: May 7, 2013

(54) HYBRID METHOD FOR FULL WAVEFORM INVERSION USING SIMULTANEOUS AND SEQUENTIAL SOURCE METHOD

(75) Inventors: Partha S. Routh, Katy, TX (US); Jerome R. Krebs, Houston, TX (US); Carey Marcinkovich, The Woodlands, TX (US); Spyridon Lazaratos, Houston, TX (US); Sunwoong Lee, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 435 days.

(21) Appl. No.: 12/903,744

(22) Filed: Oct. 13, 2010

(65) Prior Publication Data

US 2012/0073824 A1   Mar. 29, 2012

Related U.S. Application Data

(60) Provisional application No. 61/386,828, filed on Sep. 27, 2010, provisional application No. 61/386,831, filed on Sep. 27, 2010.

(51) Int. Cl.
*G06G 7/48* (2006.01)

(52) U.S. Cl.
USPC .......................................................... 703/10

(58) Field of Classification Search ............... 703/10; 166/266, 369; 367/73; 702/7, 14
See application file for complete search history.

(56) References Cited

U.S. PATENT DOCUMENTS

| | | | |
|---|---|---|---|
| 3,812,457 A | 5/1974 | Weller | |
| 3,864,667 A | 2/1975 | Bahjat | |
| 4,159,463 A | 6/1979 | Silverman | |
| 4,168,485 A | 9/1979 | Payton et al. | |
| 4,545,039 A | 10/1985 | Savit | |

(Continued)

FOREIGN PATENT DOCUMENTS

| EP | 1094338 | 4/2001 |
|---|---|---|
| EP | 1746443 | 1/2007 |

(Continued)

OTHER PUBLICATIONS

Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.

(Continued)

*Primary Examiner* — Kandasamy Thangavelu
(74) *Attorney, Agent, or Firm* — ExxonMobil Upstream Research Company

(57) ABSTRACT

Method for simultaneous full-wavefield inversion of gathers of source (or receiver) encoded geophysical data to determine a physical properties model for a subsurface region, especially suitable for surveys where fixed receiver geometry conditions were not satisfied in the data acquisition. First, a shallow time window of the data (202) where the fixed receiver condition is satisfied is inverted by simultaneous encoded (203) source inversion (205). Then, the deeper time window of the data (208) is inverted by sparse sequential source inversion (209), using the physical properties model from the shallow time window (206) as a starting model (207). Alternatively, the shallow time window model is used to simulate missing far offset data (211) producing a data set satisfying the stationary receiver assumption, after which this data set is source encoded (212) and inverted by simultaneous source inversion (214).

22 Claims, 10 Drawing Sheets

(10 of 10 Drawing Sheet(s) Filed in Color)

U.S. PATENT DOCUMENTS

| | | | |
|---|---|---|---|
| 4,562,540 A | 12/1985 | Devaney | |
| 4,575,830 A | 3/1986 | Ingram et al. | |
| 4,594,662 A | 6/1986 | Devaney | |
| 4,636,956 A | 1/1987 | Vannier et al. | |
| 4,675,851 A | 6/1987 | Savit et al. | |
| 4,686,654 A | 8/1987 | Savit | |
| 4,707,812 A | 11/1987 | Martinez | |
| 4,715,020 A | 12/1987 | Landrum, Jr. | |
| 4,780,856 A | 10/1988 | Becquey | |
| 4,823,326 A | 4/1989 | Ward | |
| 4,924,390 A | 5/1990 | Parsons et al. | |
| 4,953,657 A | 9/1990 | Edington | |
| 4,969,129 A | 11/1990 | Currie | |
| 4,982,374 A | 1/1991 | Edington et al. | |
| 5,260,911 A | 11/1993 | Mason et al. | |
| 5,469,062 A | 11/1995 | Meyer, Jr. | |
| 5,583,825 A | 12/1996 | Carrazzone et al. | |
| 5,677,893 A | 10/1997 | de Hoop et al. | |
| 5,715,213 A | 2/1998 | Allen | |
| 5,717,655 A | 2/1998 | Beasley | |
| 5,719,821 A | 2/1998 | Sallas et al. | |
| 5,721,710 A | 2/1998 | Sallas et al. | |
| 5,790,473 A | 8/1998 | Allen | |
| 5,798,982 A * | 8/1998 | He et al. | 367/73 |
| 5,822,269 A | 10/1998 | Allen | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,920,828 A | 7/1999 | Norris et al. | |
| 5,924,049 A | 7/1999 | Beasley | |
| 5,999,488 A | 12/1999 | Smith | |
| 5,999,489 A | 12/1999 | Lazaratos | |
| 6,014,342 A | 1/2000 | Lazaratos | |
| 6,021,094 A | 2/2000 | Ober et al. | |
| 6,028,818 A | 2/2000 | Jeffryes | |
| 6,058,073 A | 5/2000 | VerWest | |
| 6,125,330 A | 9/2000 | Robertson et al. | |
| 6,219,621 B1 | 4/2001 | Hornbostel | |
| 6,225,803 B1 | 5/2001 | Chen | |
| 6,311,133 B1 | 10/2001 | Lailly | |
| 6,317,695 B1 | 11/2001 | Zhou | |
| 6,327,537 B1 | 12/2001 | Ikelle | |
| 6,374,201 B1 | 4/2002 | Grizon et al. | |
| 6,381,543 B1 | 4/2002 | Guerillot et al. | |
| 6,388,947 B1 | 5/2002 | Washbourne et al. | |
| 6,480,790 B1 | 11/2002 | Calvert et al. | |
| 6,522,973 B1 | 2/2003 | Tonellot et al. | |
| 6,545,944 B2 | 4/2003 | de Kok | |
| 6,549,854 B1 | 4/2003 | Malinverno et al. | |
| 6,574,564 B2 | 6/2003 | Lailly et al. | |
| 6,593,746 B2 | 7/2003 | Stolarczyk | |
| 6,662,147 B1 | 12/2003 | Fournier et al. | |
| 6,665,615 B2 | 12/2003 | Van Riel et al. | |
| 6,687,619 B2 | 2/2004 | Moerig et al. | |
| 6,687,659 B1 | 2/2004 | Shen | |
| 6,704,245 B2 | 3/2004 | Becquey | |
| 6,714,867 B2 | 3/2004 | Meunier | |
| 6,735,527 B1 | 5/2004 | Levin | |
| 6,754,590 B1 | 6/2004 | Moldoveanu | |
| 6,766,256 B2 | 7/2004 | Jeffryes | |
| 6,826,486 B1 | 11/2004 | Malinverno | |
| 6,836,448 B2 | 12/2004 | Robertsson et al. | |
| 6,842,701 B2 | 1/2005 | Moerig et al. | |
| 6,859,734 B2 | 2/2005 | Bednar | |
| 6,865,487 B2 | 3/2005 | Charron | |
| 6,865,488 B2 | 3/2005 | Moerig et al. | |
| 6,876,928 B2 | 4/2005 | Van Riel et al. | |
| 6,882,938 B2 | 4/2005 | Vaage et al. | |
| 6,882,958 B2 | 4/2005 | Schmidt et al. | |
| 6,901,333 B2 | 5/2005 | Van Reil et al. | |
| 6,903,999 B2 | 6/2005 | Curtis et al. | |
| 6,927,698 B2 | 8/2005 | Stolarczyk | |
| 6,944,546 B2 | 9/2005 | Xiao et al. | |
| 6,947,843 B2 | 9/2005 | Fisher et al. | |
| 6,970,397 B2 | 11/2005 | Castagna et al. | |
| 6,977,866 B2 | 12/2005 | Huffman et al. | |
| 6,999,880 B2 | 2/2006 | Lee | |
| 7,046,581 B2 | 5/2006 | Calvert | |
| 7,050,356 B2 | 5/2006 | Jeffryes | |
| 7,069,149 B2 | 6/2006 | Goff et al. | |
| 7,072,767 B2 | 7/2006 | Routh et al. | |
| 7,092,823 B2 | 8/2006 | Lailly et al. | |
| 7,110,900 B2 | 9/2006 | Adler et al. | |
| 7,184,367 B2 | 2/2007 | Yin | |
| 7,230,879 B2 | 6/2007 | Herkenoff et al. | |
| 7,271,747 B2 | 9/2007 | Baraniuk | |
| 7,330,799 B2 | 2/2008 | Lefebvre et al. | |
| 7,337,069 B2 | 2/2008 | Masson et al. | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,376,539 B2 | 5/2008 | Lecomte | |
| 7,400,978 B2 | 7/2008 | Langlais et al. | |
| 7,436,734 B2 | 10/2008 | Krohn | |
| 7,480,206 B2 | 1/2009 | Hill | |
| 7,584,056 B2 | 9/2009 | Koren | |
| 7,599,798 B2 | 10/2009 | Beasley et al. | |
| 7,602,670 B2 | 10/2009 | Jeffryes | |
| 7,616,523 B1 | 11/2009 | Tabti et al. | |
| 7,620,534 B2 | 11/2009 | Pita et al. | |
| 7,646,924 B2 | 1/2010 | Donoho | |
| 7,672,194 B2 | 3/2010 | Jeffryes | |
| 7,672,824 B2 | 3/2010 | Dutta et al. | |
| 7,675,815 B2 | 3/2010 | Saenger | |
| 7,679,990 B2 | 3/2010 | Herkenoff | |
| 7,715,985 B2 | 5/2010 | Manen et al. | |
| 7,715,986 B2 | 5/2010 | Nemeth et al. | |
| 7,725,266 B2 | 5/2010 | Sirgue et al. | |
| 7,791,980 B2 | 9/2010 | Robertsson et al. | |
| 7,835,072 B2 | 11/2010 | Izumi | |
| 7,840,625 B2 | 11/2010 | Candes et al. | |
| 2002/0099504 A1 | 7/2002 | Cross et al. | |
| 2002/0120429 A1 | 8/2002 | Ortoleva | |
| 2002/0183980 A1 | 12/2002 | Guillaume | |
| 2004/0199330 A1 * | 10/2004 | Routh et al. | 702/14 |
| 2006/0235666 A1 | 10/2006 | Assa et al. | |
| 2007/0036030 A1 | 2/2007 | Baumel et al. | |
| 2007/0038691 A1 | 2/2007 | Candes et al. | |
| 2007/0274155 A1 | 11/2007 | Ikelle | |
| 2008/0175101 A1 | 7/2008 | Saenger et al. | |
| 2008/0306692 A1 | 12/2008 | Singer et al. | |
| 2009/0070042 A1 | 3/2009 | Birchwood et al. | |
| 2009/0071647 A1 * | 3/2009 | Vinegar et al. | 166/266 |
| 2009/0083006 A1 | 3/2009 | Mackie | |
| 2009/0164186 A1 | 6/2009 | Haase et al. | |
| 2009/0164756 A1 | 6/2009 | Dokken et al. | |
| 2009/0187391 A1 | 7/2009 | Wendt et al. | |
| 2009/0204327 A1 * | 8/2009 | Lu et al. | 702/7 |
| 2009/0248308 A1 | 10/2009 | Luling | |
| 2009/0254320 A1 | 10/2009 | Lovatini et al. | |
| 2009/0259406 A1 | 10/2009 | Khadhraoui et al. | |
| 2010/0008184 A1 | 1/2010 | Hegna et al. | |
| 2010/0018718 A1 * | 1/2010 | Krebs et al. | 166/369 |
| 2010/0039894 A1 | 2/2010 | Abma | |
| 2010/0054082 A1 | 3/2010 | McGarry et al. | |
| 2010/0088035 A1 | 4/2010 | Etgen et al. | |
| 2010/0103772 A1 | 4/2010 | Eick et al. | |
| 2010/0118651 A1 | 5/2010 | Liu et al. | |
| 2010/0142316 A1 | 6/2010 | Keers et al. | |
| 2010/0161233 A1 | 6/2010 | Saenger et al. | |
| 2010/0161234 A1 | 6/2010 | Saenger et al. | |
| 2010/0185422 A1 | 7/2010 | Hoversten | |
| 2010/0208554 A1 | 8/2010 | Chiu et al. | |
| 2010/0212902 A1 | 8/2010 | Williams et al. | |
| 2011/0000678 A1 * | 1/2011 | Krebs et al. | 166/369 |
| 2011/0120724 A1 * | 5/2011 | Krohn | 166/369 |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO2009/067041 | 5/2009 |
| WO | WO 2009/067041 | 5/2009 |
| WO | WO 2009/117174 | 9/2009 |

OTHER PUBLICATIONS

Ben-Hadj-Ali, H. et al. (2009), "Three-dimensional frequency-domain full waveform inversion with phase encoding," *SEG Expanded Abstracts*, pp. 2288-2292.
Griewank, A. (2000), Evaluating Derivatives: Principles and Techniques of Algorithmic Differentiation, Society for Industrial and Applied Mathematics, 49 pgs.
Helbig, K. (1994), "Foundations of Anisotropy for Exploration Seismics," Chapter 5, pp. 185-194.
Hu, L.Z. et al. (1987), "Wave-field transformations of vertical seismic profiles," *Geophysics* 52, pp. 307-321.
Liu, F. et al. (2007), "Reverse-time migration using one-way wavefield imaging condition," *SEG Expanded Abstracts* 26, pp. 2170-2174.
Mora, P. (1987), "Elastic Wavefield Inversion," PhD Thesis, Stanford University, pp. 22-25.
Mora, P. (1989), "Inversion = migration + tomography," *Geophysics* 64, pp. 888-901.
Neelamani, R. (2009), "Efficient seismic forward modeling using simultaneous sources and sparsity," *SEG Expanded Abstracts*, pp. 2107-2111.
Pratt, R.G. et al. (1998), "Gauss-Newton and full Newton methods in frequency-space seismic waveform inversion," *Geophys. J. Int.* 133, pp. 341-362.
Sheng, J. et al. (2006), "Early arrival waveform tomography on near-surface refraction data," *Geophysics* 71, pp. U47-U57.
Simard, P.Y. et al. (1990), "Vector Field Restoration by the Method of Convex Projections," *Computer Vision, Graphics and Image Processing* 52, pp. 360-385.
Spitz, S. (2008), "Simultaneous source separation: a prediction-subtraction approach," 78th Annual Int'l. Meeting, *SEG Expanded Abstracts*, pp. 2811-2815.
Tang, Y. (2008), "Wave-equation Hessian by phase encoding," *SEG Expanded Abstracts* 27, pp. 2201-205.
Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.
Tsvankin, I. (2001), "Seismic Signatures and Analysis of Reflection Data in Anisotropic Media," Elsevier Science, p. 8.
Xie, X. et al. (2002), "Extracting angle domain information from migrated wavefield," *SEG Expanded Abstracts*21, pp. 1360-1363.
Xie, X.-B. et al. (2006), "Wave-equation-based seismic illumination analysis," *Geophysics* 71(5), pp. S169-S177.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," SIAM, 20 pgs.
Akerberg, P., et al. (2008), "Simultaneous source separation by sparse radon transform," 78th Annual International Meeting, SEG, Expanded Abstracts, pp. 2801-2805.
Beasley, C. (2008), "A new look at marine simultaneous sources," *The Leading Edge* 27(7), pp. 914-917.
Becquey, M. et al. (2002), "Pseudo-Random Coded Simultaneous Vibroseismics," *SEG Int'l. Exposition and 72$^{th}$ Annl Mtg*, 4 pages.
Bonomi, E. et al. (2006), "Wavefield Migration plus Monte Carlo Imaging of 3D Prestack Seismic Data," *Geophysical Prospecting* 54, pp. 505-514.
Berkhout, A.J. (1992), "Areal shot record technology," *Journal of Seismic Exploration* 1, pp. 251-264.
Berkhout, A.J. (2008), "Changing the mindset in seismic data acquisition," *The Leading Edge* 27(7), pp. 924-938.
Fallat, M.R. et al. (1997), "Geoacoustic inversion via local, global, and hybrid algorithms," *J. of the Acoustical Society of America* 105, pp. 3219-3230.
Haber, E., et al. (2010), "An effective method for parameter estimation with PDE constraints with multiple right hand sides," Preprint—UBC http://www.math.ubc.ca, 20 pgs.

Herrmann, F. J. (2010), "Randomized dimensionality reduction for full-waveform inversion," *EAGE abstract* G001, EAGE Barcelona meeting, 5 pgs.
Ikelle, L.T. (2007), "Coding and decoding: Seismic data modeling, acquisition, and processing," 77th Annual Int'l. Meeting, SEG Expanded Abstracts, pp. 66-70.
Jing X. (2000), "Encoding multiple shot gathers in prestack migration," SEG Int'l. Exp. and 70$^{th}$ Annual Meeting, *Expanded Abstracts*, pp. 786-789.
Krebs, J.R. (200), "Full-wavefield seismic inversion using encoded sources," *Geophysics* 74(6), pp. WCC177-WCC188.
Liao, Q. et al. (1995), "2.5D full-wavefield viscoacoustic inversion," *Geophysical Prospecting* 43, pp. 1043-1059.
Mora, P. (1987), "Nonlinear two-dimensional elastic inversion of multi-offset seismic data," *Geophysics* 52, pp. 1211-1228.
Neelamani, R., (2008), "Simultaneous sourcing without compromise," 70th Annual Int'l. Conf. and Exh., EAGE, 5 pgs.
Romero, L.A. (2000), "Phase encoding of shot records in prestack migration," *Geophysics* 65, pp. 426-436.
Sirgue, L. (2004), "Efficient waveform inversion and imaging: A strategy for selecting temporal frequencies," *Geophysics* 69, pp. 231-248.
Stefani, J. (2007), "Acquisition using simultaneous sources," 69th Annual Conf. and Exh., *EAGE Extended Abstracts*, 5 pgs.
Tarantola, A. (1984), "Inversion of seismic reflection data in the acoustic approximation," *Geophysics* 49, pp. 1259-1266.
van Manen, D.J. (2005), "Making wave by time reversal," SEG International Exposition and 75$^{th}$ Annual Meeting, *Expanded Abstracts*, pp. 1763-1766.
Weglein, A.B. (2003), "Inverse scattering series and seismic exploration," *Inverse Problems* 19, pp. R27-R83.
Verschuur, D.J. (2009), Target-oriented, least-squares imaging of blended data, 79th Annual Int'l. Meeting, *SEG Expanded Abstracts*, pp. 2889-2893.
Zhang, Y. (2005), "Delayed-shot 3D depth migration," *Geophysics* 70, pp. E21-E28.
Baumstein, A. et al. (2009), "Scaling of the Objective Function Gradient for Full Wavefield Inversion," SEG Houston 2009 Int'l. Expo. & Annual Meeting, pp. 2243-2247.
Burstedde, C. et al. (2009), "Algorithmic strategies for full waveform inversion: 1D experiments," *Geophysics* 74(6), pp. WCC37-WCC46.
Lee, S. et al. (2010), "Subsurface parameter estimation in full wavefield inversion and reverse time migration," SEG Denver 2010 Annual Meeting, pp. 1065-1069.
Malmedy, W. et al. (2009), "Approximating Hessians in unconstrained optimization arising from discretized problems," *Computational Optimization and Applications*, pp. 1-16.
Martin, G.S. et al. (2006), "Marmousi2: An elastic upgrade for Marmousi," *The Leading Edge*, pp. 156-166.
Nocedal, J. et al. (2006) "*Numerical Optimization, Chapt. 7—Large-Scale Unconstrained Optimization*," Springer, New York, 2$^{nd}$ Edition, pp. 165-176.
Sheen, D-H. et al. (2006), "Time domain Gauss-Newton seismic waveform inversion in elastic media," *Geophysics J. Int.* 167, pp. 1373-1384.
Tarantola, A. (1986), "A strategy for nonlinear elastic inversion of seismic reflection data," *Geophysics* 51(10), pp. 1893-1903.
Tarantola, A. (2005), "Inverse Problem Theory and Methods for Model Parameter Estimation," *SIAM*, p. 79.
Abt, D.L. et al. (2010), "North American lithospheric discontinuity structured imaged by Ps and Sp receiver functions", *J. Geophys. Res.*, 24 pgs.
Aki, K. et al. (1980), "Quantitative Seismology: Theory and Methods vol. I—Chapter 7—Surface Waves in a Vertically Heterogenous Medium," W.H. Freeman and Co., pp. 259-318.
Aki, K. et al. (1980), "Quantitative Seismology: Theory and Methods vol. I," W.H. Freeman and Co., p. 173.
Beylkin, G. (1985), "Imaging of discontinuities in the inverse scattring problem by inversion of a causal generalized Radon transform," *J. Math. Phys.* 26, pp. 99-108.
Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Berkhout, A.J. (1987), "Applied Seismic Wave Theory," Elsevier Science Publishers, p. 142.

Bunks, C., et al. (1995), "Multiscale seismic waveform inversion," *Geophysics* 60, pp. 1457-1473.

Chavent, G. et al. (1999), "An optimal true-amplitude least-squares prestack depth-migration operator," *Geophysics* 64(2), pp. 508-515.

Clapp, R.G. (2009), "Reverse time migration with random boundaries," SEG International Exposition and Meeting, Expanded Abstracts, pp. 2809-2813.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P And SV waves from multicomponent offset vertical seismic profiles", *Geophysics* 55(1), pp. 39-50.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gibson, B. et al. (1984), "Predictive deconvolution and the zero-phase source," *Geophysics* 49(4), pp. 379-397.

Griewank, A. (1992), "Achieving logarithmic growth of temporal and spatial complexity in reverse automatic differentiation," 1 *Optimization Methods and Software*, pp. 35-54.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Holschneider, J. et al. (2005), "Characterization of dispersive surface waves using continuous wavelet transforms," *Geophys. J. Int.* 163, pp. 463-478.

Jackson, D.R. et al. (1991), "Phase conjugation in underwater acoustics," *J. Acoust. Soc. Am.* 89(1), pp. 171-181.

Kennett, B.L.N. (1991), "The removal of free surface interactions from three-component seismograms", *Geophys. J. Int.* 104, pp. 153-163.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pages.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lecomte, I. (2008), "Resolution and illumination analyses in PSDM: A ray-based approach," The Leading Edge, pp. 650-663.

Maharramov, M. et al. (2007), "Localized image-difference wave-equation tomography," SEG Annual Meeting, *Expanded Abstracts*, pp. 3009-3013.

Marcinkovich, C. et al. (2003), "On the implementation of perfectly matched layers in a three-dimensional fourth-order velocity-stress finite difference scheme," *J. of Geophysical Research* 108(B5), 2276.

Meier, M.A. et al. (2009), "Converted wave resolution," Geophysics, 74(2):doi:10.1190/1.3074303, pp. Q1-Q16.

Nazarian, S. et al. (1983), "Use of spectral analysis of surface waves method for determination of moduli and thickness of pavement systems," *Transport Res. Record* 930, pp. 38-45.

Plessix, R.E. et al. (2004), "Frequency-domain finite-difference amplitude preserving migration," *Geophys. J. Int.* 157, pp. 975-987.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133. pp. 341-362.

Rayleigh, J.W.S. (1899), "On the transmission of light through an atmosphere containing small particles in suspension, and on the origin of the blue of the sky," *Phil. Mag.*47, pp. 375-384.

Ryden, N. et al. (2006), "Fast simulated annealing inversion of surface waves on pavement using phase-velocity spectra," *Geophysics*71(4), pp. R49-R58.

Sheriff, R.E.et al. (1982), "*Exploration Seismology*", pp. 134-135.

Shin, C. et al. (2001), "Waveform inversion using a logarithmic wavefield," *Geophysics* 49, pp. 592-606.

Symes, W.W. (2007), Reverse time migration with optimal checkpointing, *Geophysics* 72(5), pp. P.SM213-SM221.

Tarantola, A. (1988), "Theoretical background for the inversion of seismic waveforms, including elasticity and attenuation," *Pure and Applied Geophysics* 128, pp. 365-399.

Trantham, E.C. (1994), "Controlled-phase acquisition and processing," *SEG Expanded Abstracts* 13, pp. 890-894.

Vigh, D. et al. (2008), "3D prestack plane-wave, full-waveform inversion," *Geophysics* 73(5), pp. VE135-VE144.

Xia, J. et al. (2004), "Utilization of high-frequency Rayleigh waves in near-surface geophysics," *The Leading Edge*, pp. 753-759.

Ziolkowski, A. (1991), "Why don't we measure seismic signatures?," *Geophysics* 56(2), pp. 190-201.

Boonyasiriwat, C. et al. (2010), 3D Multisource Full-Waveform using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dunkin, J.W. et al. (1973), "Effect of Normal Moveout on a Seismic Pluse," *Geophysics* 38(4), pp. 635-642.

Igel, H. et al. (1996), "Waveform inversion of marine reflection seismograms for *P* impedance and Poisson's ratio," *Geophys. J Int.* 124i, pp. 363-371.

Lancaster, S. et al. (2000), "Fast-track 'colored' inversion," 70th SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Levanon, N. (1988), "Radar Principles," Chpt. 1, John Whiley & Sons, New York, pp. 1-18.

Moghaddam, P.P. et al. (2010), "Randomized full-waveform inversion: a dimenstionality-reduction approach," 80th SEG Ann. Meeting, *Expanded Abstracts*, pp. 977-982.

Ostmo, S. et al. (2002), "Finite-difference iterative migration by linearized waveform inversion in the frequency domain," SEG Int'l. Expo. & 72nd Ann. Meeting, 4 pgs.

Pica, A. et al. (2005), "3D Surface-Related Multiple Modeling, Principles and Results," 2005 SEG Ann. Meeting, *SEG Expanded Abstracts* 24, pp. 2080-2083.

Rawlinson, N. et al. (2008), "A dynamic objective function technique for generating multiple solution models in seismic tomography," *Geophys. J. Int.* 178, pp. 295-308.

Schuster, G.T. et al. (2010), "Theory of Multisource Crosstalk Reduction by Phase-Encoded Statics," *SEG Denver 2010 Ann. Meeting*, pp. 3110-3114.

Shen, P. et al. (2003), "Differential semblance velocity analysis by wave-equation migration," $73^{rd}$ Ann. Meeting of Society of Exploration Geophysicists, 4 pgs.

Shih, R-C. et al. (1996), "Iterative pre-stack depth migration with velocity analysis," *Terrestrial, Atmospheric & Oceanic Sciences* 7(2), pp. 149-158.

van Groenestijn, G.J.A. et al. (2009), "Estimating primaries by sparse inversion and application to near-offset reconstruction," *Geophyhsics* 74(3), pp. A23-A28.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Wang, Y. (2007), "Multiple prediction through inversion: Theoretical advancements and real data application," *Geophysics* 72(2), pp. V33-V39.

Wang, K. et al. (2009), "Simultaneous full-waveform inversion for source wavelet and earth model," SEG Int'l. Expo. & Ann. Meeting, *Expanded Abstracts*, pp. 2537-2541.

Wu R-S. et al. (2006), "Directional illumination analysis using beamlet decomposition and propagation," *Geophysics* 71(4), pp. S147-S159.

\* cited by examiner

HYBRID METHOD FOR FULL WAVEFORM INVERSION USING SIMULTANEOUS AND SEQUENTIAL SOURCE METHOD

CROSS REFERENCE TO RELATED APPLICATIONS

This application claims the benefit of U.S. Provisional Application 61/386,828 filed on Sep. 27, 2010, which is incorporated herein by reference. This application is related to that particular application entitled "Simultaneous Source Encoding and Source Separation as a Practical Solution for Full Wavefield Inversion" filed on the same date as the present application and claiming the benefit of U.S. Provisional Application 61/386,831 filed on Sep. 27, 2010. This related application is also incorporated by reference herein.

FIELD OF THE INVENTION

The invention relates generally to the field of geophysical prospecting, and more particularly to geophysical data processing. Specifically, the invention is a method for inversion of data acquired from multiple geophysical sources such as seismic sources, involving geophysical simulation that computes the data from many simultaneously-active geophysical sources in one execution of the simulation.

BACKGROUND OF THE INVENTION

Geophysical inversion [1,2] attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories:

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

Iterative inversion is generally preferred over non-iterative inversion, because it yields more accurate subsurface parameter models. Unfortunately, iterative inversion is so computationally expensive that it is impractical to apply it to many problems of interest. This high computational expense is the result of the fact that all inversion techniques require many compute intensive simulations. The compute time of any individual simulation is proportional to the number of sources to be inverted, and typically there are large numbers of sources in geophysical data, where the term source as used in the preceding refers to an activation location of a source apparatus. The problem is exacerbated for iterative inversion, because the number of simulations that must be computed is proportional to the number of iterations in the inversion, and the number of iterations required is typically on the order of hundreds to thousands.

The most commonly employed iterative inversion method employed in geophysics is cost function optimization. Cost function optimization involves iterative minimization or maximization of the value, with respect to the model M, of a cost function S(M) which is a measure of the misfit between the calculated and observed data (this is also sometimes referred to as the objective function), where the calculated data are simulated with a computer using the current geophysical properties model and the physics governing propagation of the source signal in a medium represented by a given geophysical properties model. The simulation computations may be done by any of several numerical methods including but not limited to finite difference, finite element or ray tracing. The simulation computations can be performed in either the frequency or time domain.

Cost function optimization methods are either local or global [3]. Global methods simply involve computing the cost function S(M) for a population of models $\{M_1, M_2, M_3, \ldots\}$ and selecting a set of one or more models from that population that approximately minimize S(M). If further improvement is desired this new selected set of models can then be used as a basis to generate a new population of models that can be again tested relative to the cost function S(M). For global methods each model in the test population can be considered to be an iteration, or at a higher level each set of populations tested can be considered an iteration. Well known global inversion methods include Monte Carlo, simulated annealing, genetic and evolution algorithms.

Unfortunately global optimization methods typically converge extremely slowly and therefore most geophysical inversions are based on local cost function optimization. Algorithm 1 summarizes local cost function optimization.

---

Algorithm 1 - Algorithm for performing local cost function optimization.

1. selecting a starting model,
2. computing the gradient of the cost function S(M) with respect to the parameters that describe the model,
3. searching for an updated model that is a perturbation of the starting model in the negative gradient direction that better explains the observed data.

---

This procedure is iterated by using the new updated model as the starting model for another gradient search. The process continues until an updated model is found that satisfactorily explains the observed data. Commonly used local cost function inversion methods include gradient search, conjugate gradients and Newton's method.

Local cost function optimization of seismic data in the acoustic approximation is a common geophysical inversion task, and is generally illustrative of other types of geophysical inversion. When inverting seismic data in the acoustic approximation the cost function can be written as:

$$S(M) = \sum_{g=1}^{N_g} \sum_{r=1}^{N_r} \sum_{t=1}^{N_t} W(\psi_{calc}(M, r, t, w_g) - \psi_{obs}(r, t, w_g)) \quad \text{(Eqn. 1)}$$

where:
S=cost function,
M=vector of N parameters, $(m_1, m_2, \ldots m_N)$ describing the subsurface model, g=gather index,
$w_g$=source function for gather g which is a function of spatial coordinates and time, for a point source this is a delta function of the spatial coordinates,
$N_g$=number of gathers,
r=receiver index within gather,
$N_r$=number of receivers in a gather,
t=time sample index within a trace,
$N_t$=number of time samples,
W=minimization criteria function (we usually choose $W(x)=x^2$ which is the least squares (L2) criteria),
$\psi_{calc}$=calculated seismic pressure data from the model M,
$\psi_{obs}$=measured seismic pressure data.

The gathers can be any type of gather that can be simulated in one run of a seismic forward modeling program. Usually the gathers correspond to a seismic shot, although the shots can be more general than point sources. For point sources the gather index g corresponds to the location of individual point sources. For plane wave sources g would correspond to different plane wave propagation directions. This generalized source data, $\psi_{obs}$, can either be acquired in the field or can be synthesized from data acquired using point sources. The calculated data $\psi_{calc}$ on the other hand can usually be computed directly by using a generalized source function when forward modeling. For many types of forward modeling, including finite difference modeling, the computation time needed for a generalized source is roughly equal to the computation time needed for a point source.

Equation (1) can be simplified to:

$$S(M) = \sum_{g=1}^{N_g} W(\delta(M, w_g)) \qquad \text{(Eqn. 2)}$$

where the sum over receivers and time samples is now implied and, $$\delta(M, w_g) = \psi_{calc}(M, w_g) - \psi_{obs}(w_g) \qquad \text{(Eqn. 3)}$$

Inversion attempts to update the model M such that S(M) is a minimum. This can be accomplished by local cost function optimization which updates the given model $M^{(k)}$ as follows:

$$M^{(k+1)} = M^{(k)} - \alpha^{(k)} \nabla_M S(M) \qquad \text{(Eqn. 4)}$$

where k is the iteration number, $\alpha$ is the scalar size of the model update, and $\nabla_M S(M)$ is the gradient of the misfit function, taken with respect to the model parameters. The model perturbations, or the values by which the model is updated, are calculated by multiplication of the gradient of the objective function with a step length $\alpha$, which must be repeatedly calculated.

From equation (2), the following equation can be derived for the gradient of the cost function:

$$\nabla_M S(M) = \sum_{g=1}^{N_g} \nabla_M W(\delta(M, w_g)). \qquad \text{(Eqn. 5)}$$

So to compute the gradient of the cost function one must separately compute the gradient of each gather's contribution to the cost function, then sum those contributions. Therefore, the computational effort required for computing $\nabla_M S(M)$ is $N_g$ times the compute effort required to determine the contribution of a single gather to the gradient. For geophysical problems, $N_g$ usually corresponds to the number of geophysical sources and is on the order of 10,000 to 100,000, greatly magnifying the cost of computing $\nabla_M S(M)$.

Note that computation of $\nabla_M W(\delta)$ requires computation of the derivative of $W(\delta)$ with respect to each of the N model parameters $m_i$. Since for geophysical problems N is usually very large (usually more that one million), this computation can be extremely time consuming if it had to be performed for each individual model parameter. Fortunately, the adjoint method can be used to efficiently perform this computation for all model parameters at once [1]. The adjoint method for the least squares objective function and a gridded model parameterization is summarized by the following algorithm:

---

Algorithm 2 - Algorithm for computing the least-squares cost-function gradient of a gridded model using the adjoint method.

---

1. Compute forward simulation of the data using the current model and the gather signature $w_g$ as the source to get $\psi_{calc}(M^{(k)}, w_g)$,
2. Subtract the observed data from the simulated data giving $\delta(M^{(k)}, w_g)$,
3. Compute the reverse simulation (i.e. backwards in time) using $\delta(M^{(k)}, w_g)$ as the source producing $\psi_{adjoint}(M^{(k)}, w_g)$,
4. Compute the integral over time of the product of $\psi_{calc}(M^{(k)}, w_g)$ and $\psi_{adjoint}(M^{(k)}, w_g)$ to get $\nabla M^W(\delta(M, w_g))$.

---

While computation of the gradients using the adjoint method is efficient relative to other methods, it is still very costly. In particular the adjoint methods requires two simulations, one forward in time and one backward in time, and for geophysical problems these simulations are usually very compute intensive. Also, as discussed above, this adjoint method computation must be performed for each measured data gather individually, increasing the compute cost by a factor of $N_g$.

The compute cost of all categories of inversion can be reduced by inverting data from combinations of the sources, rather than inverting the sources individually. This may be called simultaneous source inversion. Several types of source combination are known including: coherently sum closely spaced sources to produce an effective source that produces a wavefront of some desired shape (e.g. a plane wave), sum widely spaces sources, or fully or partially stacking the data before inversion.

The compute cost reduction gained by inverting combined sources is at least partly offset by the fact that inversion of the combined data usually produces a less accurate inverted model. This loss in accuracy is due to the fact that information is lost when the individual sources are summed, and therefore the summed data does not constrain the inverted model as strongly as the unsummed data. This loss of information during summation can be minimized by encoding each shot record before summing. Encoding before combination preserves significantly more information in the simultaneous source data, and therefore better constrains the inversion [4]. Encoding also allows combination of closely spaced sources, thus allowing more sources to be combined for a given computational region. Various encoding schemes can be used with this technique including time shift encoding and random phase encoding. The remainder of this Background section briefly reviews various published geophysical simultaneous source techniques, both encoded and non-encoded.

Van Manen [6] suggests using the seismic interferometry method to speed up forward simulation. Seismic interferometry works by placing sources everywhere on the boundary of the region of interest. These sources are modeled individually and the wavefield at all locations for which a Green's function is desired is recorded. The Green's function between any two recorded locations can then be computed by cross-correlating the traces acquired at the two recorded locations and summing over all the boundary sources. If the data to be inverted have a large number of sources and receivers that are within the region of interest (as opposed to having one or the other on the boundary), then this is a very efficient method for computing the desired Green's functions. However, for the seismic data case it is rare that both the source and receiver for the data to be inverted are within the region of interest. Therefore, this improvement has very limited applicability to the seismic inversion problem.

Berkhout [7] and Zhang [8] suggest that inversion in general can be improved by inverting non-encoded simultaneous sources that are summed coherently to produce some desired wave front within some region of the subsurface. For example, point source data could be summed with time shifts that are a linear function of the source location to produce a down-going plane wave at some particular angle with respect to the surface. This technique could be applied to all categories of inversion. A problem with this method is that coherent summation of the source gathers necessarily reduces the amount of information in the data. So for example, summation to produce a plane wave removes all the information in the seismic data related to travel time versus source-receiver offset. This information is critical for updating the slowly varying background velocity model, and therefore Berkhout's method is not well constrained. To overcome this problem many different coherent sums of the data (e.g. many plane waves with different propagation directions) could be inverted, but then efficiency is lost since the cost of inversion is proportional to the number of different sums inverted. Herein, such coherently summed sources are called generalized sources. Therefore, a generalized source can either be a point source or a sum of point sources that produces a wave front of some desired shape.

Van Riel [9] suggests inversion by non-encoded stacking or partial stacking (with respect to source-receiver offset) of the input seismic data, then defining a cost function with respect to this stacked data which will be optimized. Thus, this publication suggests improving cost function based inversion using non-encoded simultaneous sources. As was true of the Berkhout's [6] simultaneous source inversion method, the stacking suggested by this method reduces the amount of information in the data to be inverted and therefore the inversion is less well constrained than it would have been with the original data.

Mora [10] proposes inverting data that is the sum of widely spaced sources. Thus, this publication suggests improving the efficiency of inversion using non-encoded simultaneous source simulation. Summing widely spaced sources has the advantage of preserving much more information than the coherent sum proposed by Berkhout. However, summation of widely spaced sources implies that the aperture (model region inverted) that must be used in the inversion must be increased to accommodate all the widely spaced sources. Since the compute time is proportional to the area of this aperture, Mora's method does not produce as much efficiency gain as could be achieved if the summed sources were near each other.

Ober [11] suggests speeding up seismic migration, a special case of non-iterative inversion, by using simultaneous encoded sources. After testing various coding methods, Ober found that the resulting migrated images had significantly reduced signal-to-noise ratio due to the fact that broad band encoding functions are necessarily only approximately orthogonal. Thus, when summing more than 16 shots, the quality of the inversion was not satisfactory. Since non-iterative inversion is not very costly to begin with, and since high signal-to-noise ratio inversion is desired, this technique is not widely practiced in the geophysical industry.

Ikelle [12] suggests a method for fast forward simulation by simultaneously simulating point sources that are activated (in the simulation) at varying time intervals. A method is also discussed for decoding these time-shifted simultaneous-source simulated data back into the separate simulations that would have been obtained from the individual point sources. These decoded data could then be used as part of any conventional inversion procedure. A problem with Ikelle's method is that the proposed decoding method will produce separated data having noise levels proportional to the difference between data from adjacent sources. This noise will become significant for subsurface models that are not laterally constant, for example from models containing dipping reflectors. Furthermore, this noise will grow in proportion to the number of simultaneous sources. Due to these difficulties, Ikelle's simultaneous source approach may result in unacceptable levels of noise if used in inverting a subsurface that is not laterally constant.

Source encoding proposed by Krebs et al. in PCT Patent Application Publication No. WO 2008/042081, which is incorporated herein by reference in all jurisdictions that allow it, is a very cost effective method to invert full wave field data. (The same approach of simultaneous inversion of an encoded gather will work for receivers, either via source-receiver reciprocity or by encoding the actual receiver locations in common-source gathers of data.) For fixed receivers, the forward and adjoint computations only need to be performed for a single effective source; see PCT Patent Application Publication No. WO 2009/117174, which is incorporated herein by reference in all jurisdictions that allow it. Given the fact that hundreds of shots are recorded for typical 2D acquisition geometries, and thousands in the case of 3D surveys, computational savings from this method are quite significant. In practice, a fixed receiver assumption is not strictly valid for most common field data acquisition geometries. In the case of marine streamer data, both sources and receivers move for every new shot. In addition, due to logistical problems, it is difficult to record data close to the source, and this means that near-offset data are typically missing. This is true for both marine and land surveys. Both of these factors mean that for a simultaneous source gather, every receiver location will be missing data for some source shots. In WO 08/042081, some of the disclosed embodiments may work better than others when the fixed receiver assumption is not satisfied. Therefore, it would be advantageous to have an accommodation or adjustment to straightforward application of simultaneous encoded sources (and/or receivers) inversion that would enhance its performance when the fixed receiver assumption is compromised. The present invention provides ways of doing this. Haber et al. [15] also describe an approach to the problem of moving receivers in simultaneous encoded source inversion using a stochastic optimization method, and apply it to a direct current resistivity problem.

SUMMARY OF THE INVENTION

In one embodiment, the invention is a computer-implemented method for full-wavefield inversion of measured geophysical data to determine a physical properties model for a subsurface region, comprising: (a) using a computer to invert a selected shallow time window of arrivals from the measured geophysical data by simultaneous encoded sources and/or receivers inversion to obtain a first physical properties model for the subsurface region; (b) using a computer to invert the measured geophysical data, or a selected deep time window of arrivals from the measured geophysical data, by iterative sequential source inversion, which may use only a sparse sampling of the measured data, to obtain a second physical properties model for the subsurface region, wherein the first physical properties model is used as a starting model and a set of source locations is used to update the second physical properties model in the iterative sequential source inversion; and (c) outputting, displaying, or saving to data storage the second physical properties model of the subsurface region.

In another embodiment, the invention is a computer-implemented method for full-wavefield inversion of measured geophysical data to determine a physical properties model for a subsurface region, comprising: (a) using a computer to invert a selected shallow time window of arrivals from the measured geophysical data by simultaneous encoded sources and/or receivers inversion to obtain a first physical properties model for the subsurface region; (b) using the first physical properties model to simulate, using a computer, synthetic data for longer offsets corresponding to arrivals from deeper then said shallow time window; (c) using a computer to invert the measured geophysical data, wherein the data with longer offsets are augmented, said inversion being simultaneous encoded-sources and/or encoded-receivers inversion, to obtain a second physical properties model of the subsurface region, wherein said augmented data with longer offsets are the sum of the synthetic data for longer offsets and the measured data at the longer offsets; and (d) outputting, displaying, or saving to data storage the second physical properties model of the subsurface region.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which:

as shown in FIG. 4, the fixed receiver assumption is valid for the time window 0-3 seconds;

Figure 1:
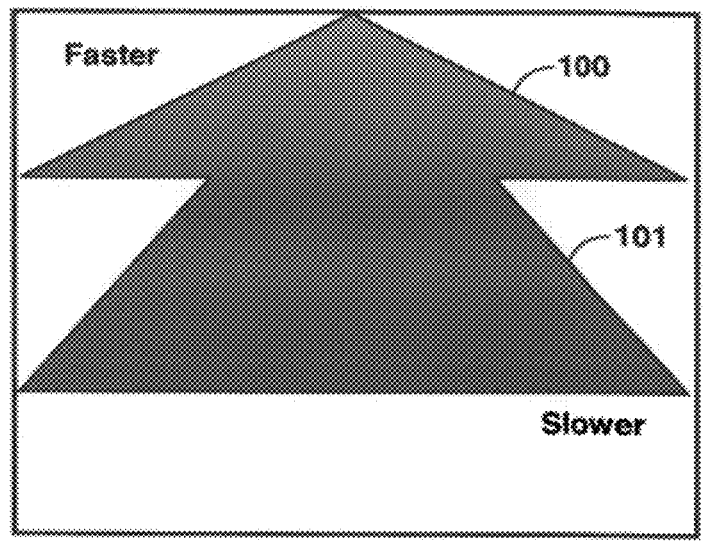
FIG. 1 is a schematic diagram showing the data window that can be used for simultaneous source inversion.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

One embodiment of the present invention is a hybrid combination of simultaneous encoded source inversion with traditional sequential source inversion. This embodiment uses simultaneous source encoding for the shallower time-window of the data and uses sparse sequential sources to invert the deeper part of the data. Krebs et al. [5, 16] show that the encoded simultaneous source cost function can be computed more efficiently than conventional cost functions while still providing accurate inversions. The simultaneous source cost function is defined here as (compare with equation (2) above):

$$S_{sim}(M) = \sum_{G=1}^{N_G} W\left(\delta\left(M, \sum_{g \in G} c_g \otimes w_g\right)\right) \quad \text{(Eqn. 6)}$$

where a summation over receivers and time samples is implied as in Eqn. (2), and:

$$\sum_{g=1}^{N_g} = \sum_{G=1}^{N_G} \sum_{g \in G}$$

defines a sum over gathers by sub groups of gathers,
$S_{sim}$=cost function for simultaneous source data,
G=the groups of simultaneous generalized sources, and
$N_G$=the number of groups,
$c_g$=functions of time that are convolved $\otimes$ with each gather's source signature to encode the gathers, these encoding functions are chosen to be approximately orthogonal with respect to some appropriate operation depending on the weighting function W. When W is the L2-Norm the appropriate operation is cross-correlation.

The outer summation in Eqn. (6) is over groups of simultaneous generalized sources corresponding to the gather type (e.g. points sources for common shot gathers). The inner summation, over g, is over the gathers that are grouped for simultaneous computation. For some forward modeling methods, such as finite difference modeling, the computation of the forward model for summed generalized sources (the inner sum over g∈G) can be performed in the same amount of time as the computation for a single source. Therefore, as shown in Krebs et. al. [5] $\delta(M,\Sigma c_g \otimes w_g)$ can be computed very efficiently using Algorithm 3.

---

Algorithm 3 - Algorithm for computing the encoded simultaneous-source cost function.

1. Simulate $\psi_{calc}(M, \Sigma c_g \otimes w_g)$ using a single run of the simulator using $\Sigma c_g \otimes w_g$ as the source,
2. Convolve each measured data gather with the $c_g$ encoding functions, then sum the resulting encoded gathers (i.e. $\Sigma c_g \otimes \psi_{obs}(w_g)$),
3. Subtract the result of step 2 from the result of step 1.

---

Again as shown in Krebs et al. [5] this algorithm can compute $S_{sim}(M)$ a factor of $N_g/N_G$ times faster than S(M) from Eqn. (2).

In fixed receiver geometry the shot gathers have complete receiver coverage. For the shallower window this can be achieved if the near offsets can be populated. The shallower windows are defined as corresponding to times smaller than the arrival times for the faster modes at the longest offsets. The size of the shallow window, over which the encoded simultaneous source approach is applicable, depends on the near-surface velocity and the maximum available offsets.

FIG. 1 is a schematic diagram showing the data window that can be used for simultaneous source inversion. The lines with smaller slopes define the bottom of the window for a faster shallow-velocity case (100). The lines with larger slopes define the bottom of the window for a slower shallow-velocity case (101). The vertical axis is time and the horizontal axis is source-receiver offset, with zero offset for the selected receiver being in the middle of the diagram, with positive offsets to the right and negative offsets to the left. The schematic shown in FIG. 1 suggests that for slow near-surface velocities the usable window (101) is longer compared to the case when the near-surface velocities are faster (100).

The negative offsets in the shot gathers may be filled using reciprocity (201). The missing near-offsets may be filled with estimated values, for example from neighboring traces (201). Filling the near-offsets in the shallow window will provide complete receiver coverage to use simultaneous source encoding. Another alternative is to simply eliminate all receivers that were a near offset for some shot. There are various prior approaches to fill in the near-offset data such as reconstruction methods typically used in surface-related multiple attenuation. This makes the shallow windowed shot gathers (202) conform to the fixed-receiver assumption preferable for simultaneous source encoding (203). Therefore, for the shallow window, one can generate simultaneous-source encoded data (204) and invert (205) for a subsurface model (206) that fits these data. Since the computation time is significantly less by several orders of magnitude, a more sophisticated simulation algorithm (e.g. elastic full wavefield inversion) can potentially be used if necessary. Following the simultaneous source inversion with the shallow windowed data, the next step is use the shallow model as a starting model (207) to invert the deeper window data (208) since the fixed receiver assumption breaks down for deeper windows.

The present inventive method includes two embodiments for inverting the deeper window data. A flowchart of these hybrid approaches is presented in FIG. 2. In the first approach shown in FIG. 2, traditional sequential-shot techniques are used to invert (209) the deeper window data (208). However, a sparser set of sources is sufficient to update the deeper part of the model (210) and may therefore be used to advantage. How many sources are required will depend on the spatial wavelength of the model and the maximum available offsets. From a physics point of view, the resolution of the subsurface degrades with depth. For example, in offset-limited data the contribution in the deeper window is dominantly from reflections rather than transmission. Thus, depending on the desired scale length of the model that needs to be updated, the choice of how many sequential sources are necessary can be problem-dependent. For example, if the goal is just to obtain a smooth velocity model that better explains the kinematics (event traveltimes), then the user of the invention can choose a sparse set of sources for inversion. If the goal is to obtain a high resolution target-oriented model update, then the user can include more sources above the target region and sparse sources everywhere else.

Figure 2:
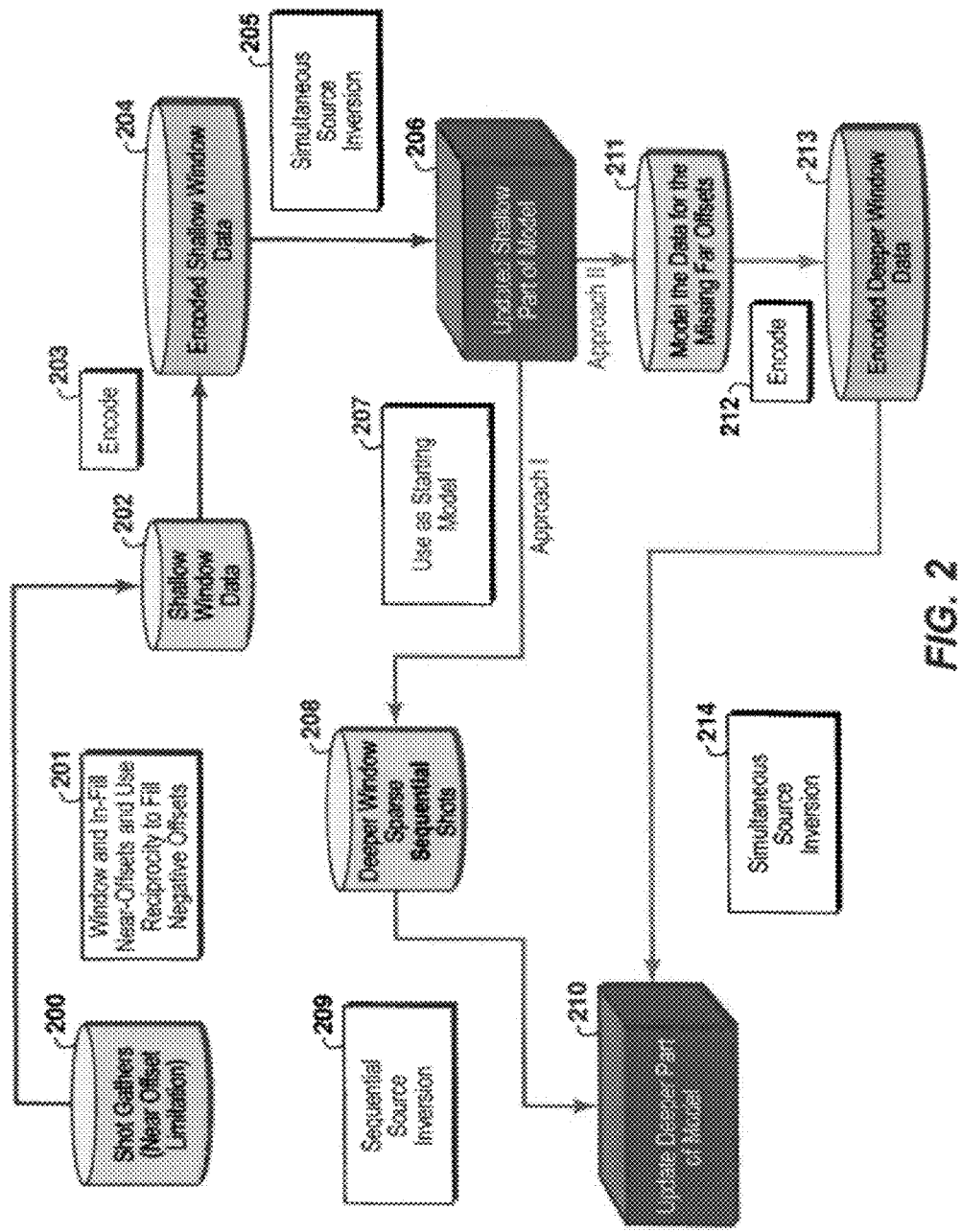
FIG. 2 is a flowchart showing basic steps in one embodiment of the present inventive method, wherein simultaneous source encoding is used in a shallow time window and sparse sequential source inversion is used for deeper windows in Approach I, and in Approach II the shallow model is used to compute the missing data traces that are first encoded to carry out simultaneous source inversion.

In the second approach (Approach II in FIG. 2), advantage is made of the fact that the shallow model (206) resulting from the shallow window inversion should be satisfactory for predicting long offset data (211) at times larger than the shallow window. Therefore, the shallow model obtained from simultaneous inversion is used to compute the data at the larger missing offsets (211). The advantage of this approach is that with the available far-offset traces obtained using forward modeling, the fixed receiver assumption can be applied. Thus with the available data along with the computed far offsets, the shot gathers can be encoded (212) for deeper window (213) inversion (214), as indicated in FIG. 2.

The present invention's hybrid approach is not only applicable to streamer data, but also to a variety of other acquisition geometries where the fixed-receiver assumption breaks down. For example, ocean bottom cable (OBC) acquisitions are typically patch-based (fixed receivers for a subset of shots), and they do not conform to the idealized situation where all receivers are fixed and recording for all shots. Similarly for land acquisitions due to logistical problems the fixed receiver geometry is difficult to achieve.

Many types of encoding functions $c_g$ can be used in equation (6) including but not limited to:

- Linear, random, chirp and modified-chirp frequency-dependent phase encoding as presented in Romero et al. [13];
- The frequency independent phase encoding as presented in Jing et al. [14];
- Random time shift encoding;
- Frequency division multiplexing (FDMA), time division multiplexing (TDMA) and code division multiplexing (CDMA) used in telecommunications.

Some of these encoding techniques will work better than others depending upon the application, and some can be combined. In particular, good results have been obtained using frequency dependent random phase encoding and also by combining frequency independent encoding of nearby sources with frequency dependent random phase encoding for more widely separated sources. An indication of the relative merits of different encodings can be obtained by running test inversions with each set of encoding functions to determine which converges faster.

It should be noted that the simultaneous encoded-source technique can be used for many types of inversion cost function. In particular it could be used for cost functions based on other norms than L2 discussed above. It could also be used on more sophisticated cost functions than the one presented in Equation 2, including regularized cost functions. Finally, the simultaneous encoded-source method could be used with any type of global or local cost function inversion method including Monte Carlo, simulated annealing, genetic algorithm, evolution algorithm, gradient line search, conjugate gradients and Newton's method.

The present inventive method can also be used in conjunction with various types of generalized source techniques, such as those suggested by Berkhout [7]. In this case, rather than encoding different point source gather signatures, one would encode the signatures for different synthesized plane waves.

Some variations on the embodiment described above include:

- The $c_g$ encoding functions can be changed for each iteration of the inversion. In at least some instances this leads to faster convergence of the inversion.
- In some cases (e.g., when the source sampling is denser than the receiver sampling) it may be advantageous to use reciprocity to treat the actual receivers as computational sources, and encode the receivers instead of the sources.
- This invention is not limited to single-component point receivers. For example, the receivers could be receiver arrays or they could be multi-component receivers.
- The method may be improved by optimizing the encoding to yield the highest quality inversion. For example the encoding functions could be optimized to reduce the number of local minima in the cost function. The encoding functions could be optimized either by manual inspection of tests performed using different encoding functions or using an automated optimization procedure.
- Acquisition of simultaneous encoded-source data could result in significant geophysical data acquisition cost savings.
- For marine seismic data surveys, it would be very efficient to acquire encoded source data from multiple simultaneously operating marine vibrators that operate continuously while in motion.
- As indicated above, the encoding process in the present invention may be performed in the field acquisition of the data, for example where the pilot signals of multiple simultaneously operating vibrators are encoded with different encoding functions. In the attached claims, steps referring to encoding geophysical data, or to geophysical data from encoded sources, or to obtaining encoded gathers of geophysical data will be understood to include obtaining data already encoded in the field acquisition process, except where the context clearly indicates that encoding is occurring in a data processing step.
- Other definitions for the cost function may be used, including the use of a different norm (e.g. L1 norm (absolute value) instead of L2 norm), and additional terms to regularize and stabilize the inversion (e.g. terms that would penalize models that aren't smooth or models that are not sparse).

EXAMPLE

FIGS. 3-11 present a synthetic example of inverting constant-density acoustic seismic data using the hybrid approach of this invention when the fixed receiver assumption is violated. The results are compared with the simultaneous source inversion where the fixed receiver assumption is valid.

Figure 3:
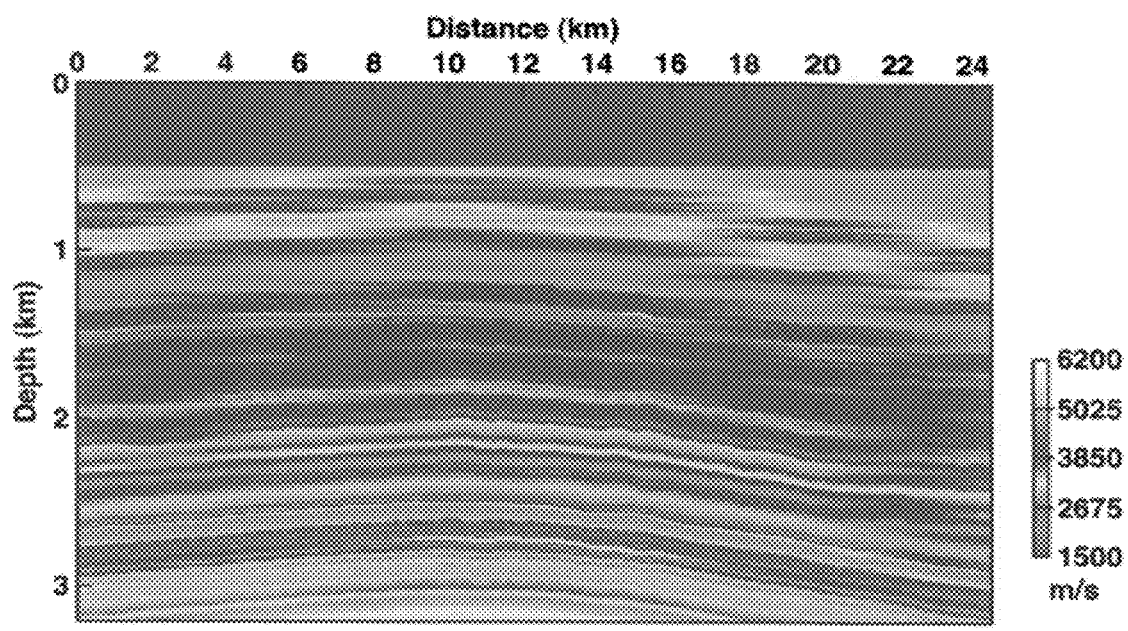
FIG. 3 shows the "true" velocity model used in the example to generate the measured data.

FIG. 3 is the true velocity model, i.e. the velocity model that will be used to generate synthetic data. The model has 500 m of water depth and the reservoir is depth of 3 km.

Figure 4:
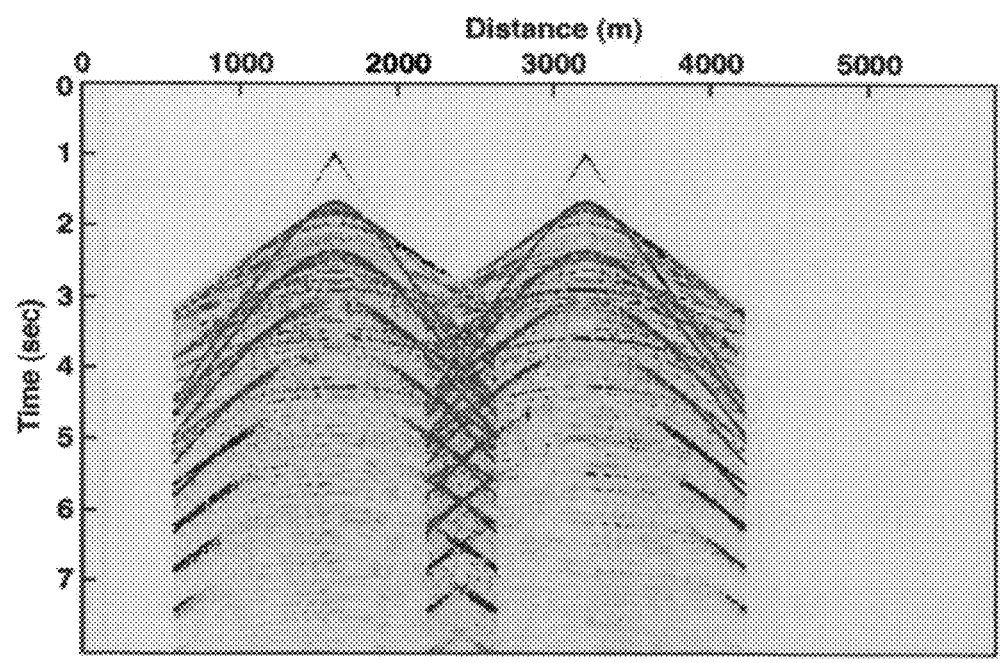
FIG. 4 shows two shot gathers of sequential source data computed using the velocity model in FIG. 3 and encoded using binary encoding described in WO 2008/042081, indicating a shallow time window of 0-3 seconds.
Figure 5:
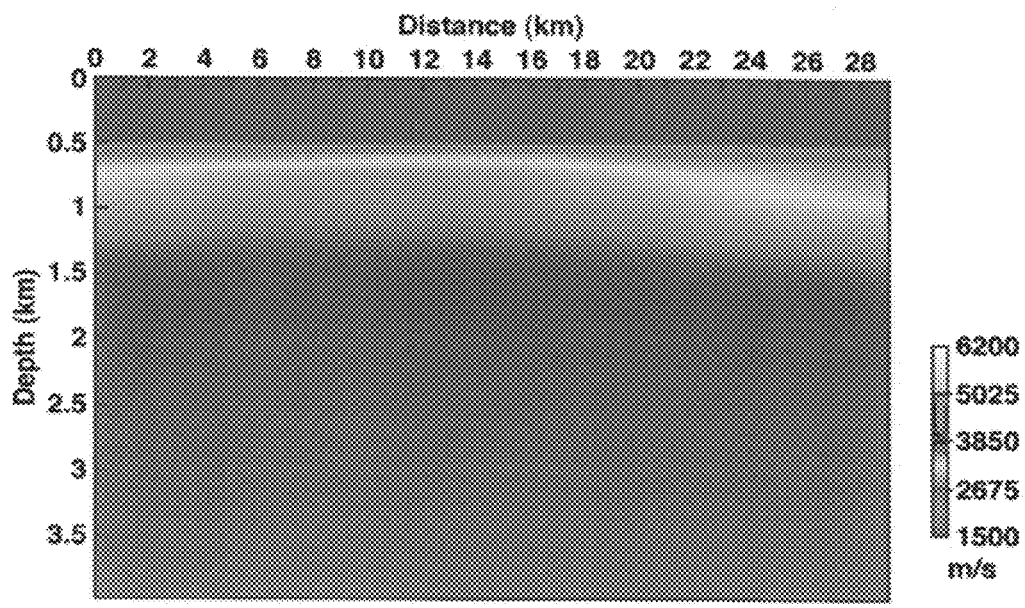
FIG. 5 shows the starting velocity model for the full wavefield inversion in the test example.

FIG. 4 shows an example of two far-offset limited representative shot gathers encoded using binary encoding described in PCT Patent Application Publication No. WO 2008/042081. The offset-limited nature of the shot gathers that is evident from the figure makes the fixed-receiver assumption invalid. However, it can also be seen that the fixed-receiver assumption is valid for the shallow time window from 0 to about 3 seconds. FIG. 4 shows that the receivers for the left shot between x=800 and x=2000 do not have any contribution from the right shot, i.e. energy from the right shot does not reach those receivers before 3 seconds. Similarly the receivers for the right shot between x=2800 and x=4200 do not have any contribution from left shot in the shallow time window between 0 and 3 seconds. The maximum far-offset used in this example is 5 km. The data are generated using 80 m shot spacing and receiver separation is 10 m. This example uses near-offset data computed using the model. To generate the starting velocity model for inversion, the common depth point (CDP) gathers are generated with the 5-km offset-limited sequential shots, and Kirchoff depth migration is used to flatten the common image gathers. The starting velocity model shown in FIG. 5 is obtained using Kirchoff depth migration. Since the depth migration fits the kinematic part of the data, the starting model is a smooth model.

The starting model in FIG. 5 is used next to invert encoded data using simultaneous source inversion. Since full wavefield inversion is highly nonlinear problem, time-frequency windowing is typically necessary to make the problem well-posed for stable convergence to the desired solution.

Figure 6:
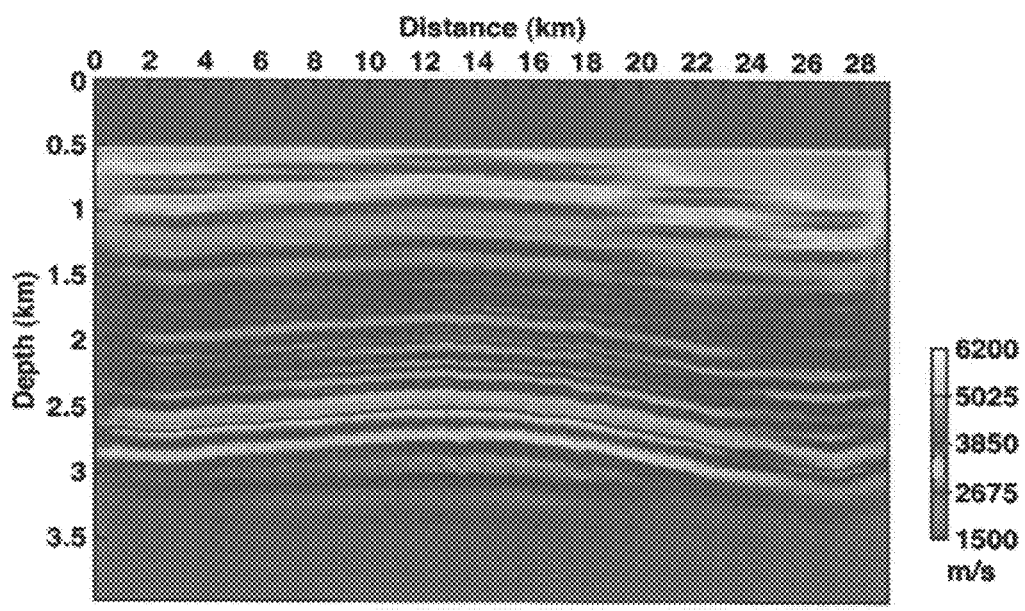
FIG. 6 shows the model obtained from simultaneous source inversion by inverting the low frequency data (peak frequency of 7 Hz) from the shallow window (0-3 seconds)
Figure 7:
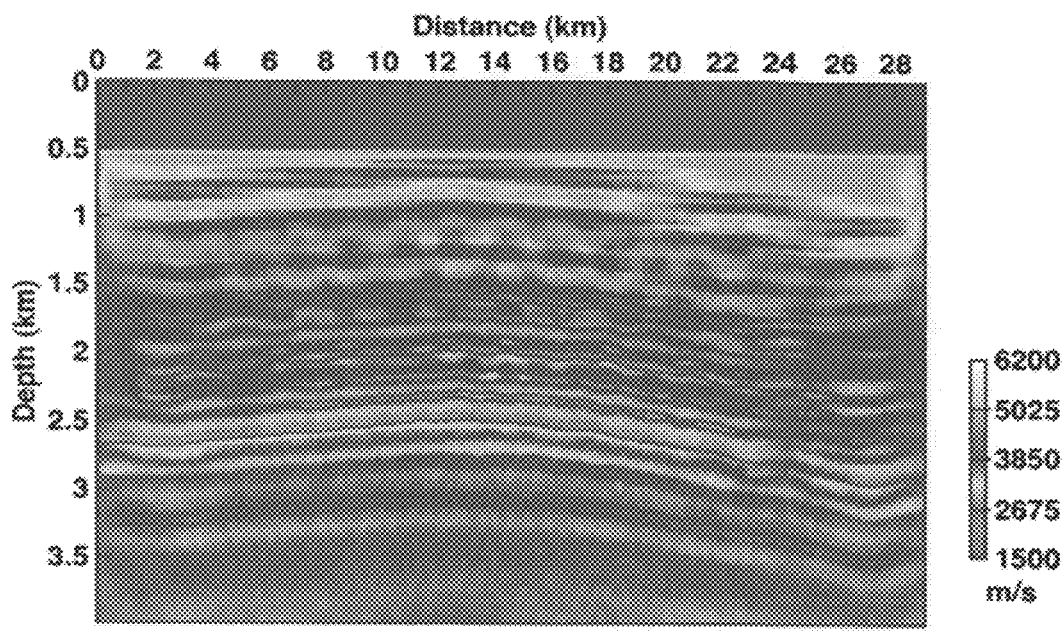
FIG. 7 shows the model obtained using simultaneous source inversion of low frequency data (peak frequency of 7 Hz) with the data window from 0-4 seconds; since the fixed receiver assumption is no longer valid, artifacts can clearly be seen in the inverted model.
Figure 8:
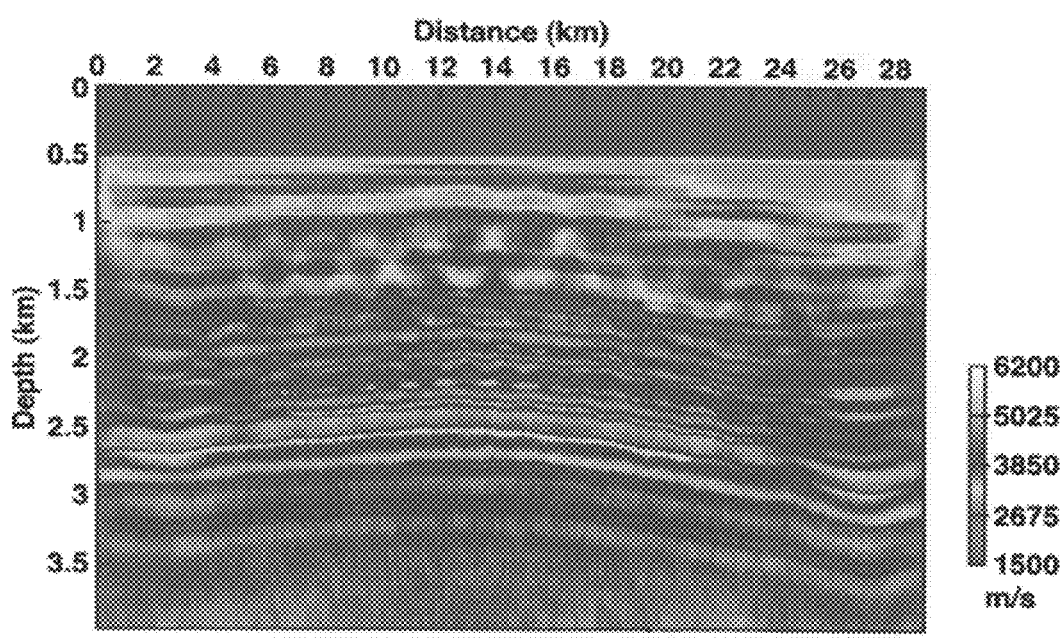
FIG. 8 shows the model obtained using simultaneous source inversion of low frequency data (peak frequency of 7 Hz) with the data window from 0-5 seconds; since the fixed receiver assumption is no longer valid, artifacts can clearly be seen in the inverted model.

FIG. 6 shows the model obtained by inverting the low frequency data (with peak frequency of 7 Hz). Since the fixed receiver assumption is not violated up to 3 seconds of the data (shown in FIG. 4), the recovered model achieved stable convergence with simultaneous source inversion. For the time windowed data up to 3 s, the maximum offset is about 5 km. Thus the inversion recovers the shallower part of the model well compared to the deeper part. FIGS. 7 and 8 show the result of inverting the data with time window of 4 s and 5 s, respectively. It is clear from the results that the inverted model has artifacts since the encoded data in these time windows do not have the large offset data and as a result the incorrect gradient is computed for model updating. Because the fixed receiver assumption is violated in these time windows, the simultaneous source inversion produces artifacts in the model.

Figure 9:
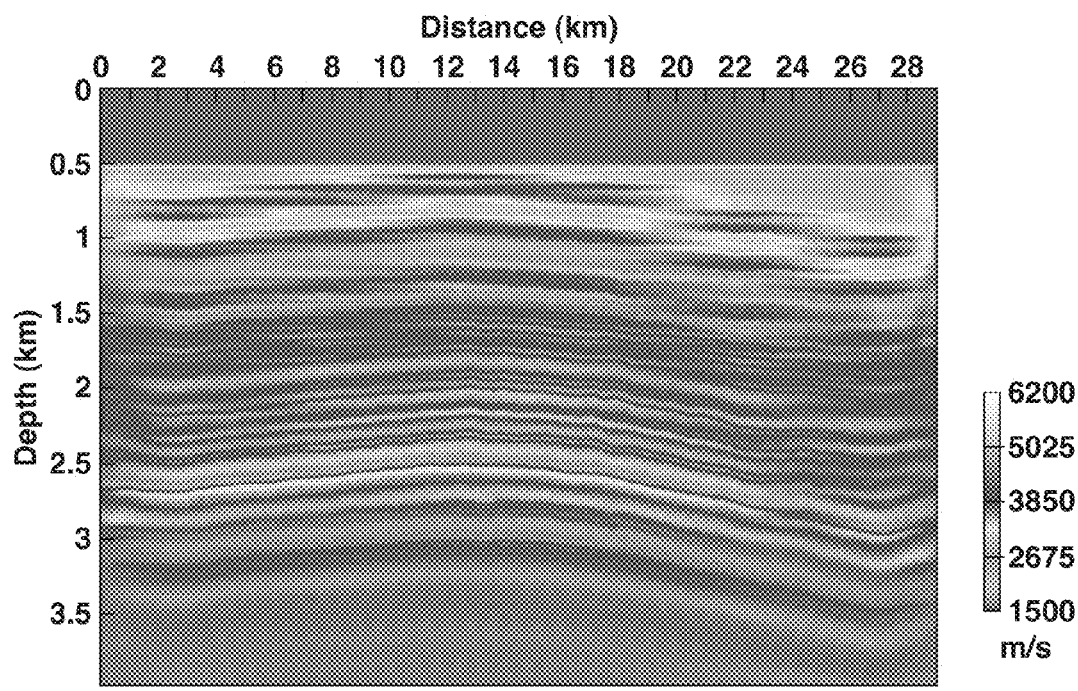
FIG. 9 shows the model obtained in the test example by using sequential source inversion of low frequency data (peak frequency of 7 Hz) with the data window from 0-4 seconds using a sparse set of sources with shot separation of 1.2 km; since sequential sources are used, the model does not have any artifacts compared to FIG. 7.
Figure 10:
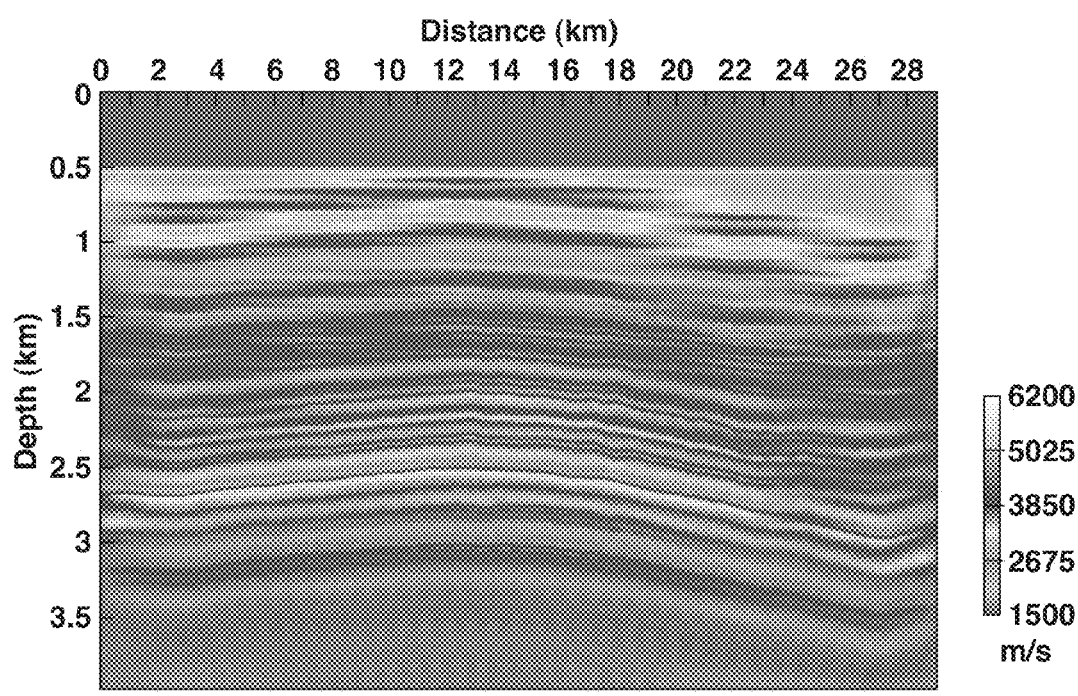
FIG. 10 shows the model obtained in the test example using sequential source inversion of low frequency data (peak frequency of 7 Hz) with the data window from 0-5 seconds using a sparse set of sources with shot separation of 1.2 km; since sequential sources are used, the model does not have any artifacts compared to FIG. 8.

The model obtained from shallow window simultaneous source inversion (FIG. 5) is used as the starting model for the sequential source inversion for the deeper time window 4 s. A sparse set of sources (20 sources out of 383 sources used for encoding the data) is used for the 4 s window inversion. The resulting model is shown in FIG. 9. Using the model from FIG. 9 as starting model, the 5 s windowed data are inverted. For the 5 s data inversion, only 10 sequential sources are used. The resulting model is shown in FIG. 10. For offset-limited data, the aperture becomes limited with depth, hence a sparse set of sources are sufficient to obtain a reasonable model. Using sparse sources provides a significant decrease in the computational effort.

Figure 11:
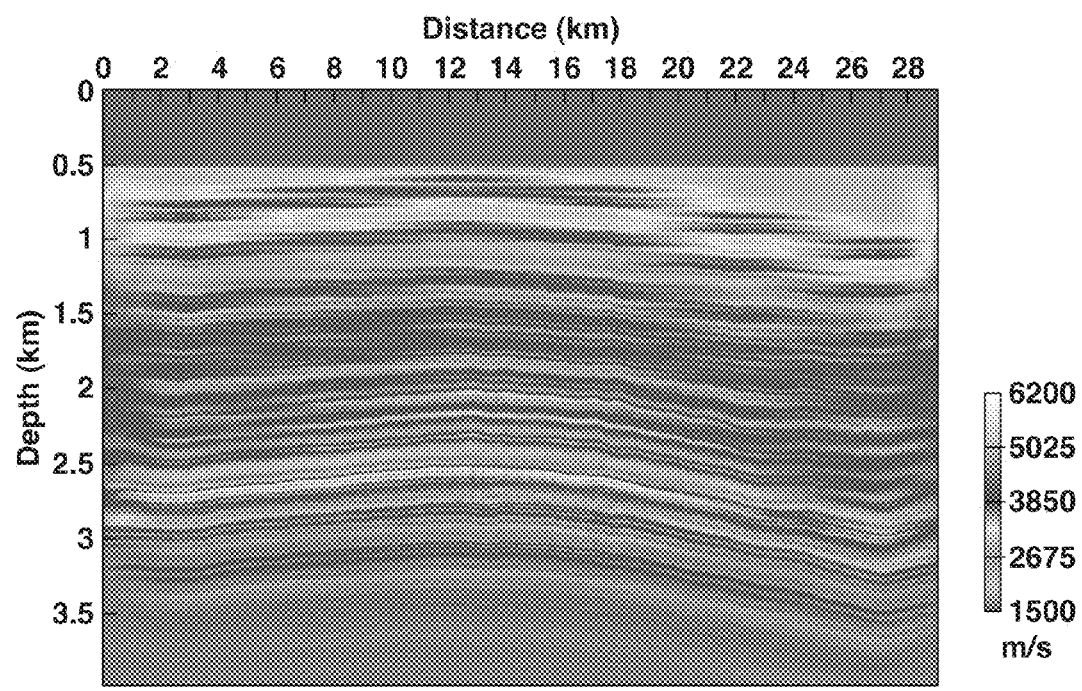
FIG. 11 shows the model obtained in the test example using sequential source inversion of full band frequency data (peak frequency of 40 Hz) with the data window from 0-5 seconds using a sparse set of sources with shot separation of 1.2 km; since sequential sources are used, the model does not have any artifacts compared to FIG. 8.

FIG. 11 shows the result of inverting the 5 s data window with full band data (peak frequency of 40 Hz) with 10 sequential sources.

In the example presented above, the measured near-offset data were used. In practice, the marine streamer data typically have missing near-offsets. In the next example, offset data up to 200 m are eliminated. The goal here is to show the impact of the missing near offsets in the simultaneous inversion and its importance to be included in the encoded data.

Figure 12:
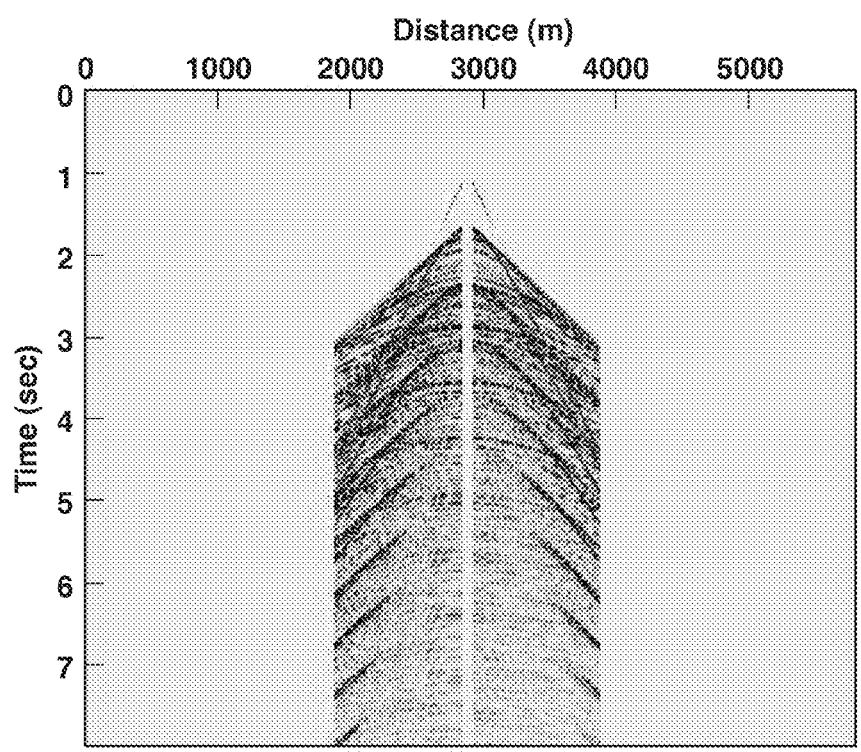
FIG. 12 shows a near and far-offset limited shot gather computed in the test example using the true model in FIG. 3; the nearest available offset is 200 m and farthest available offset is 5000 m.
Figure 14:
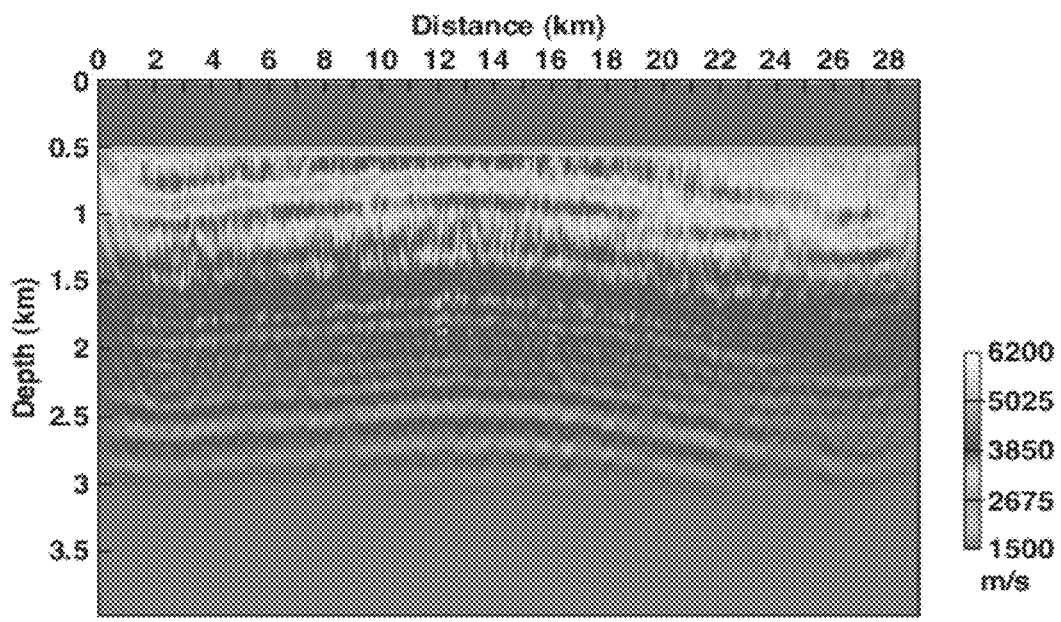
FIG. 14 illustrates inversion using the encoded data with near-offset limited shot gathers shown in FIG. 12, the model shown at iteration 5 obtained with simultaneous source inversion with the low frequency data (peak frequency of 7 Hz)
Figure 15:
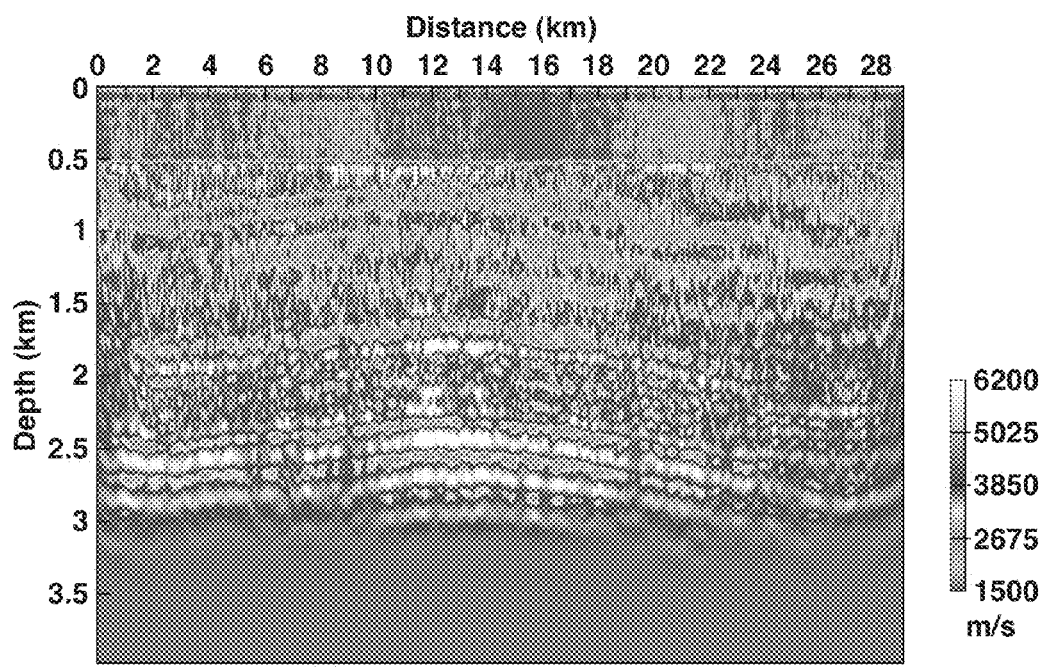
FIG. 15 illustrates inversion using the encoded data with near-offset limited shot gathers shown in FIG. 12, the model shown at iteration 10 obtained with simultaneous source inversion with the low frequency data (peak frequency of 7 Hz); it clearly shows that the model has diverged with significant artifacts.

FIG. 12 shows a representative shot gather with missing offsets that are encoded for simultaneous inversion. Since there is missing near-offset information in the encoded data, the simultaneous inversion not only produces artifacts in the recovered model, but it is also difficult to fit the data. The recovered model at iteration 5 and 50 is shown in FIGS. 14 and 15, respectively. The inverted model has significant artifacts and the solution has completely diverged for the low frequency data inversion. FIG. 15 shows that due to missing near-offset information in the encoded data, there are large velocity artifacts in the water layer. To improve the solution, data interpolation or regularization can be used to fill in the near-offset traces. This is a common procedure for preparing data for multiple elimination problems. Another factor that leads to the artifacts in the inversion is the missing large energy data due to direct arrivals. Typically the near-offset data with direct arrivals have significant energy, therefore from a data fitting point of view it has large contribution to the data misfit. The missing information in the measured encoded data exacerbates the problem and causes the inversion to diverge, resulting in significant artifacts. Recognizing this aspect of data fitting, the problem can be circumvented to an extent by masking or muting the gradient in the shallow part of the model that is commonly associated with water velocity. This is demonstrated in the next example.

Figure 13:
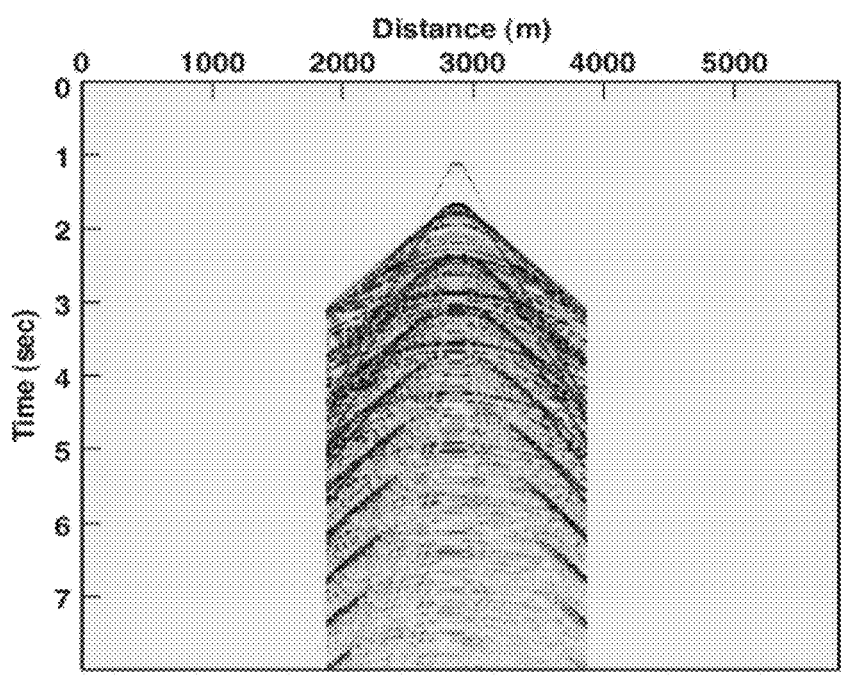
FIG. 13 shows the near-offset limited shot gather in FIG. 12 filled with the trace from nearest available offset at x=200.

Instead of interpolating the near-offsets traces that is a common procedure for multiple-elimination, the nearest available trace at 200 m is used and multiple copies are made to populate the missing near-offset traces, with this trace shown in FIG. 13. The data are then encoded using binary encoding for simultaneous inversion. During the simultaneous inversion of the low frequency encoded data for the shallow 3 s time windowed data, the gradient in the water layer is muted so that the error accumulated in the water layer does not propagate for the model updating in the deeper part and cause the inversion to diverge.

Figure 16:
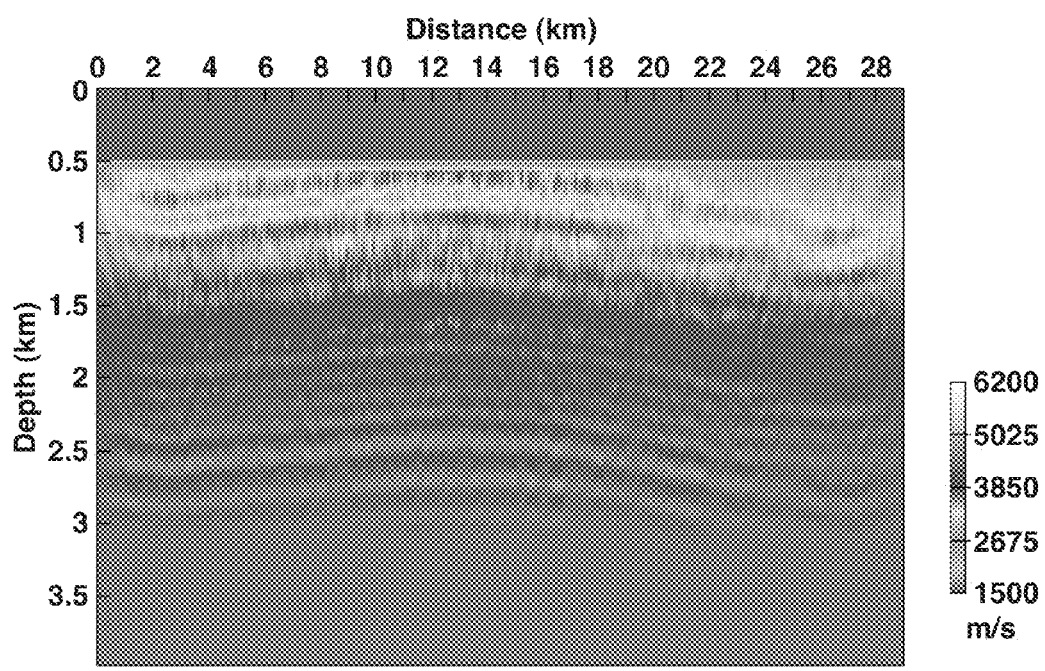
FIG. 16 illustrates inversion using the encoded data with near-offset filled shot gathers shown in FIG. 13 (since the near-offset filling was approximate the gradient in the water layer is muted to reduce the impact of the approximation on the simultaneous source inversion), the model shown at iteration 5 obtained with simultaneous source inversion with the low frequency data (peak frequency of 7 Hz)
Figure 17:
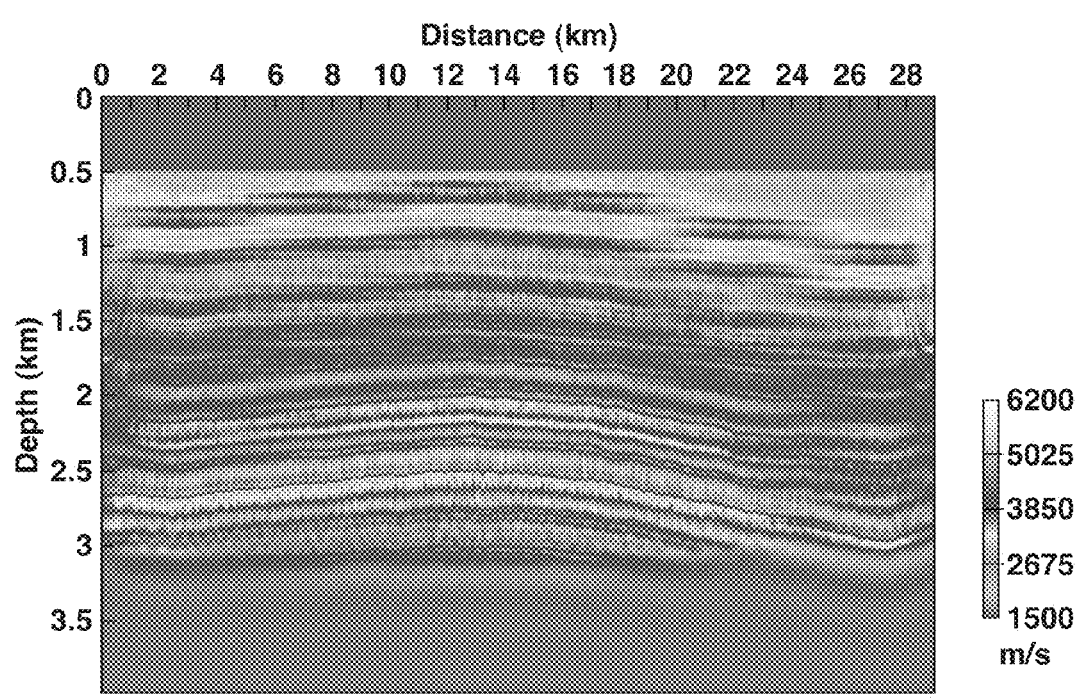
FIG. 17 illustrates inversion using the encoded data with near-offset filled shot gathers shown in FIG. 13 (since the near-offset filling was approximate the gradient in the water layer is muted to reduce the impact of the approximation on the simultaneous source inversion), the model shown at iteration 200 obtained with simultaneous source inversion with the low frequency data (peak frequency of 7 Hz).

FIGS. 16 and 17 show the inversion result for iteration 5 and 200, respectively, using simultaneous source inversion of the low frequency data with gradient muting in the water layer. FIG. 17 clearly shows that the inversion is stable and the recovered model is similar to the inversion in FIG. 5. The results should further improve if the near-offsets are interpolated using data regularization methods such as radon interpolation. All of the examples presented demonstrate the approach "I" described in FIG. 2.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting updated physical properties model may either be downloaded, displayed, or saved to computer storage.

REFERENCES

1. Tarantola, A., "Inversion of seismic reflection data in the acoustic approximation," *Geophysics* 49, 1259-1266 (1984).
2. Sirgue, L., and Pratt G. "Efficient waveform inversion and imaging: A strategy for selecting temporal frequencies," *Geophysics* 69, 231-248 (2004).
3. Fallat, M. R., Dosso, S. E., "Geoacoustic inversion via local, global, and hybrid algorithms," *Journal of the Acoustical Society of America* 105, 3219-3230 (1999).
4. Hinkley, D. and Krebs, J., "Gradient computation for simultaneous source inversion," PCT Patent Application Publication No. WO 2009/117174.
5. Krebs, J. R., Anderson, J. A., Neelamani, R., Hinkley, D., Jing, C., Dickens, T., Krohn, C., Traynin, P., "Iterative inversion of data from simultaneous geophysical sources," PCT Patent Application Publication No. WO 2008/042081.
6. Van Manen, D. J., Robertsson, J. O. A., Curtis, A., "Making wave by time reversal," *SEG International Exposition and 75th Annual Meeting Expanded Abstracts*, 1763-1766 (2005).
7. Berkhout, A. J., "Areal shot record technology," *Journal of Seismic Exploration* 1, 251-264 (1992).
8. Zhang, Y., Sun, J., Notfors, C., Gray, S. H., Cherris, L., Young, J., "Delayed-shot 3D depth migration," *Geophysics* 70, E21-E28 (2005).
9. Van Riel, P., and Hendrik, W. J. D., "Method of estimating elastic and compositional parameters from seismic and echo-acoustic data," U.S. Pat. No. 6,876,928 (2005).
10. Mora, P., "Nonlinear two-dimensional elastic inversion of multi-offset seismic data," *Geophysics* 52, 1211-1228 (1987).

11. Ober, C. C., Romero, L. A., Ghiglia, D. C., "Method of Migrating Seismic Records," U.S. Pat. No. 6,021,094 (2000).
12. Ikelle, L. T., "Multi-shooting approach to seismic modeling and acquisition," U.S. Pat. No. 6,327,537 (2001).
13. Romero, L. A., Ghiglia, D. C., Ober, C. C., Morton, S. A., "Phase encoding of shot records in prestack migration," *Geophysics* 65, 426-436 (2000).
14. Jing X., Finn, C. J., Dickens, T. A., Willen, D. E., "Encoding multiple shot gathers in prestack migration," *SEG International Exposition and 70th Annual Meeting Expanded Abstracts,* 786-789 (2000).
15. Haber, E., Chung M. and Herrmann, "An effective method for parameter estimation with PDE constraints with multiple right hand sides," Preprint—UBC http://www-.math.ubc.ca/~haber/pubs/PdeOptStochV5.pdf (2010).
16. Jerome R. Krebs, John E. Anderson, David Hinkley, Ramesh Neelamani, Sunwoong Lee, Anatoly Baumstein, and Martin-Daniel Lacasse, "Full-wavefield seismic inversion using encoded sources," *Geophysics* 74-6, WCC177-WCC188 (2009).

The invention claimed is:

1. A computer-implemented method for full-wavefield inversion of measured geophysical data to determine a physical properties model for a subsurface region, comprising:
    using a computer to invert a selected shallow time window of arrivals from the measured geophysical data by simultaneous encoded sources and/or receivers inversion to obtain a first physical properties model for the subsurface region;
    using a computer to invert the measured geophysical data, or a selected deep time window of arrivals from the measured geophysical data, by iterative sequential source inversion to obtain a second physical properties model for the subsurface region, wherein the first physical properties model is used as a starting model and a set of source locations is used to update the second physical properties model in the iterative sequential source inversion; and
    outputting, displaying, or saving to data storage the second physical properties model of the subsurface region.

2. The method of claim 1, wherein the shallow time window consists of arrival times smaller than arrival times for fastest propagation modes at longest offsets, wherein offset is source-receiver spacing.

3. The method of claim 1, wherein how many source locations are used to update the second physical properties model in the iterative sequential source inversion is determined based at least in part on spatial wavelength of the second physical properties model and maximum available offsets in the measured geophysical data.

4. The method of claim 1, wherein the set of source locations used to update the second physical properties model in the iterative sequential source inversion consists of fewer source locations than are represented in the measured geophysical data or are used in the simultaneous encoded sources and/or receivers inversion.

5. The method of claim 1, wherein:
    missing data for negative offsets in the selected shallow time window of arrivals are filled from positive offset data using source-receiver reciprocity; and
    missing near-offset data in the selected shallow time window of arrivals are provided with estimated values, or, alternatively, receivers that were a near offset for some source shot are not considered in the method.

6. The method of claim 1, wherein the measured geophysical data were acquired in a survey using non-stationary receivers.

7. The method of claim 1, further comprising using iterative inversion in the simultaneous encoded sources and/or receivers inversion, wherein the sources and or receivers are encoded using a selected set of encoding functions, and wherein a different set of encoding functions is selected for at least one of the iterations.

8. The method of claim 1, wherein the measured geophysical data are seismic data.

9. The method of claim 1, wherein the simultaneous encoded sources and/or receivers inversion comprises:
    (a) obtaining a group of two or more encoded gathers of the measured geophysical data for the shallow time window, wherein each gather is associated with a single generalized source or with a single receiver, and wherein each gather is encoded with a different encoding signature selected from a set of non-equivalent encoding signatures;
    (b) summing the encoded gathers in the group by summing all data records in each gather that correspond to a single receiver, or to a single source if receiver gathers are used, and repeating for each different receiver or source, resulting in a simultaneous encoded gather;
    (c) assuming a physical properties model of the subsurface region, said assumed model providing values of at least one physical property at locations in the subsurface region;
    (d) calculating an update to the assumed physical properties model that is more consistent with the simultaneous encoded gather from step (b), said calculation involving one or more encoded simultaneous source forward or reverse simulation operations that use the assumed physical properties model and encoded source signatures using the same encoding functions used to encode corresponding gathers of measured data, wherein an entire simultaneous encoded gather is simulated in a single simulation operation;
    (e) repeating step (d) at least one more iteration, using the updated physical properties model from the previous iteration of step (d) as the assumed model to produce a further updated physical properties model of the subsurface region that is more consistent with a corresponding simultaneous encoded gather of measured data, using the same encoding signatures for source signatures in the simulation as were used in forming the corresponding simultaneous encoded gather of measured data; and
    (f) taking the further updated physical properties model for the first physical properties model.

10. The method of claim 9, further comprising obtaining at least one additional group of two or more encoded gathers of the measured geophysical data as in step (a), and performing step (b) for each additional group, then accumulating the corresponding updates to the physical properties model from step (d), wherein the updated physical properties model to be used in step (e) is based on the accumulated updates.

11. The method of claim 9, wherein said encoded gathers of measured data are encoded by temporally convolving all traces from a gather with the encoding signature selected for the gather.

12. The method of claim 9, wherein the two or more encoded gathers of measured data are obtained by obtaining gathers of data from a geophysical survey in which data are acquired from a plurality of simultaneously operating, uniquely encoded source devices.

13. The method of claim 1, wherein the simultaneous encoded sources and/or receivers inversion comprises:
(a) obtaining a group of two or more encoded gathers of the measured geophysical data from the shallow time window, wherein each gather is associated with a single generalized source or with a single receiver, and wherein each gather is encoded with a different encoding function selected from a set of non-equivalent encoding functions;
(b) summing the encoded gathers in the group by summing all data records in each gather that correspond to a single receiver, or to a single source if receiver gathers are used, and repeating for each different receiver or source, resulting in a simultaneous encoded gather;
(c) assuming a physical properties model of the subsurface region, said model providing values of at least one physical property at locations in the subsurface region;
(d) inverting the group of two or more encoded gathers, one encoded gather at a time, all data traces in each encoded gathered being inverted simultaneously, using the assumed physical properties model as an initial model and iteratively updating said model to minimize a cost function measuring degree of misfit between model-simulated data and the measured geophysical data in the encoded gathers to generate an updated physical properties model, wherein model adjustments are made using a gradient of the cost function with respect to at least one model parameter, which gradient is computed from a time integration of a product of encoded simultaneous-source data simulated forward in time and encoded simultaneous-source data simulated backward in time; and
(e) taking the updated physical properties model as the first physical properties model.

14. The method of claim 13, wherein said encoded gathers of measured data are encoded by temporally convolving all traces from a gather with the encoding function selected for the gather.

15. The method of claim 13, wherein the two or more encoded gathers of measured data are obtained by obtaining gathers of data from a geophysical survey in which data are acquired from a plurality of simultaneously operating, uniquely encoded source devices.

16. A method for producing hydrocarbons from a subsurface region, comprising:
performing a geophysical survey of the subsurface region resulting in measured geophysical data;
processing the measured geophysical data on a computer by a method of claim 1 to generate a physical properties model of the subsurface region;
assessing hydrocarbon potential of the subsurface region using the physical properties model; and
drilling a well into the subsurface region based at least in part on the assessment of hydrocarbon potential, and producing hydrocarbons from the well.

17. A computer-implemented method for full-wavefield inversion of measured geophysical data to determine a physical properties model for a subsurface region, comprising:
using a computer to invert a selected shallow time window of arrivals from the measured geophysical data by simultaneous encoded sources and/or receivers inversion to obtain a first physical properties model for the subsurface region;
using the first physical properties model to simulate, using a computer, synthetic data for longer offsets corresponding to arrivals from deeper than said shallow time window;
using a computer to invert the measured geophysical data, wherein the data with longer offsets are augmented, said inversion being simultaneous encoded sources and/or encoded receivers inversion, to obtain a second physical properties model of the subsurface region, wherein said augmented data with longer offsets are sum of the synthetic data for longer offsets and the measured data at the longer offsets; and
outputting, displaying, or saving to data storage the second physical properties model of the subsurface region.

18. The method of claim 17, wherein the measured geophysical data were acquired in a survey using non-stationary receivers.

19. The method of claim 17, wherein:
all simultaneous encoded source inversions are iterative,
the sources are encoded using a selected set of encoding functions, and
a different set of encoding functions is selected for at least one of the iterations.

20. A method for producing hydrocarbons from a subsurface region, comprising:
performing a geophysical survey of the subsurface region resulting in measured geophysical data;
processing the measured geophysical data on a computer by a method of claim 8 to generate a physical properties model of the subsurface region;
assessing hydrocarbon potential of the subsurface region using the physical properties model; and
drilling a well into the subsurface region based at least in part on the assessment of hydrocarbon potential, and producing hydrocarbons from the well.

21. A computer program product, comprising a non-transitory computer usable medium having a computer readable program code embodied therein, said computer readable program code adapted to be executed to implement a method for full-wavefield inversion of measured geophysical data to determine a physical properties model for a subsurface region, said method comprising:
inverting a selected shallow time window of arrivals from the measured geophysical data by simultaneous encoded sources and/or receivers inversion to obtain a first physical properties model for the subsurface region;
inverting the measured geophysical data, or a selected deep time window of arrivals from the measured geophysical data, by iterative sequential source inversion to obtain a second physical properties model for the subsurface region, wherein the first physical properties model is used as a starting model and a set of source locations is used to update the second physical properties model in the iterative sequential source inversion; and
outputting, displaying, or saving to data storage the second physical properties model of the subsurface region.

22. A computer program product, comprising a non-transitory computer usable medium having a computer readable program code embodied therein, said computer readable program code adapted to be executed to implement a method for full-wavefield inversion of measured geophysical data to determine a physical properties model for a subsurface region, said method comprising:
inverting a selected shallow time window of arrivals from the measured geophysical data by simultaneous encoded sources and/or receivers inversion to obtain a first physical properties model for the subsurface region;
using the first physical properties model to simulate synthetic data for longer offsets corresponding to arrivals from deeper than said shallow time window;

inverting the measured geophysical data, wherein the data with longer offsets are augmented, said inversion being simultaneous encoded sources and/or encoded receivers inversion, to obtain a second physical properties model of the subsurface region, wherein said augmented data with longer offsets are sum of the synthetic data for longer offsets and the measured data at the longer offsets; and outputting, displaying, or saving to data storage the second physical properties model of the subsurface region.

* * * * *